(12) United States Patent
Hodsdon et al.

(10) Patent No.: US 7,914,869 B2
(45) Date of Patent: Mar. 29, 2011

(54) MOBILE DEVICE LABEL WITH NEGATIVE IMAGE FEATURE

(75) Inventors: Jerry G. Hodsdon, Forestdale, MA (US); Douglas W. Wilson, San Dimas, CA (US); Russ Pollman, Fullerton, CA (US); Keith A. Newburry, Pasadena, CA (US)

(73) Assignee: Avery Dennison Corporation, Pasadena, CA (US)

( * ) Notice: Subject to any disclaimer, the term of this patent is extended or adjusted under 35 U.S.C. 154(b) by 880 days.

(21) Appl. No.: 11/239,379

(22) Filed: Sep. 28, 2005

(65) Prior Publication Data

US 2006/0233994 A1    Oct. 19, 2006

Related U.S. Application Data

(60) Provisional application No. 60/672,620, filed on Apr. 18, 2005.

(51) Int. Cl.
  *B32B 9/00* (2006.01)
  *G09F 3/00* (2006.01)
  *B65D 65/28* (2006.01)

(52) U.S. Cl. .......... 428/40.1; 428/42.1; 428/43

(58) Field of Classification Search .......... 428/40.1, 428/42.1, 43; 40/299.01, 336, 360
See application file for complete search history.

(56) References Cited

U.S. PATENT DOCUMENTS

| | | |
|---|---|---|
| 2,294,347 A | 8/1942 | Bauer et al. |
| 2,671,678 A | 3/1954 | Walsh |
| 2,682,721 A | 7/1954 | Harris |
| 2,721,810 A | 10/1955 | Schram |
| 2,783,172 A | 2/1957 | Avery |
| 3,148,468 A | 9/1964 | Vander Weel et al. |
| 3,153,868 A | 10/1964 | Jones |
| 4,204,706 A | 5/1980 | Blum et al. |
| 4,439,757 A | 3/1984 | Gross et al. |
| 4,504,550 A | 3/1985 | Pook |
| 4,627,994 A | 12/1986 | Welsch |
| 4,696,843 A | 9/1987 | Schmidt |

(Continued)

FOREIGN PATENT DOCUMENTS

DE         20101039         6/2001

(Continued)

OTHER PUBLICATIONS

AT&T Wireless/Nokia 3200 "American Idol" faceplace advertisement (2 pages).

(Continued)

*Primary Examiner* — Patricia L Nordmeyer
(74) *Attorney, Agent, or Firm* — Patent Group Law Department

(57) ABSTRACT

An adhesive label is configured to be wrapped around an apparatus and to outline a predetermined image having first and second components. A first facestock has opposite first and second edges that come into proximity with one another when the label is wrapped around the apparatus. The first edge includes first contours that outline the first component of the predetermined image, and the second edge includes second contours that outline the second component. A multilayer sheet assembly comprises the adhesive label, wherein the first facestock inner surface includes a lined portion that is covered by a release liner, and an unlined portion that is not covered by the release liner. The sheet assembly further comprises a second facestock that covers at least some of the unlined portion of the first facestock inner surface, and is adhered thereto using an adhesive.

1 Claim, 18 Drawing Sheets

U.S. PATENT DOCUMENTS

| | | | |
|---|---|---|---|
| 4,873,643 | A | 10/1989 | Powell et al. |
| 4,951,970 | A | 8/1990 | Burt |
| 5,000,379 | A | 3/1991 | LaRue |
| 5,025,581 | A | 6/1991 | Polzin |
| 5,029,099 | A | 7/1991 | Goodman |
| 5,083,979 | A | 1/1992 | Burt |
| 5,113,435 | A | 5/1992 | Chen |
| 5,135,789 | A | 8/1992 | Schmidt |
| 5,203,851 | A | 4/1993 | Browning et al. |
| 5,348,780 | A | 9/1994 | Boggs et al. |
| 5,459,819 | A | 10/1995 | Watkins et al. |
| 5,466,321 | A | 11/1995 | Miyaji |
| 5,487,568 | A | 1/1996 | Ipsen |
| 5,561,604 | A | 10/1996 | Buckley et al. |
| 5,568,695 | A | 10/1996 | Kough |
| 5,572,573 | A | 11/1996 | Sylvan et al. |
| 5,662,976 | A | 9/1997 | Popat et al. |
| 5,664,013 | A | 9/1997 | Rossi |
| 5,674,018 | A | 10/1997 | Kaufman et al. |
| 5,745,566 | A | 4/1998 | Petrella et al. |
| 5,782,598 | A | 7/1998 | Salzberger |
| 5,789,051 | A | 8/1998 | Tracy |
| 5,819,284 | A | 10/1998 | Farber et al. |
| 5,853,837 | A | 12/1998 | Popat |
| 5,870,683 | A | 2/1999 | Wells et al. |
| 5,892,892 | A | 4/1999 | Popat et al. |
| 5,923,556 | A | 7/1999 | Harris |
| 5,923,752 | A | 7/1999 | McBride et al. |
| 5,946,635 | A | 8/1999 | Dominguez |
| 5,958,595 | A | 9/1999 | Toomey |
| 5,960,078 | A | 9/1999 | Eckhardt |
| 5,971,270 | A | 10/1999 | Barna |
| 5,974,230 | A | 10/1999 | Jenkins |
| 5,982,881 | A | 11/1999 | Mischenko |
| 5,993,928 | A | 11/1999 | Popat |
| 5,997,680 | A | 12/1999 | Popat |
| 6,027,598 | A * | 2/2000 | Anderson ..................... 156/253 |
| 6,035,180 | A | 3/2000 | Kubes et al. |
| 6,082,535 | A | 7/2000 | Mitchell |
| 6,085,126 | A | 7/2000 | Mellgren et al. |
| 6,085,195 | A | 7/2000 | Hoyt et al. |
| 6,116,906 | A | 9/2000 | Rifkin |
| 6,155,026 | A | 12/2000 | Tracy |
| 6,177,925 | B1 | 1/2001 | Soloway |
| 6,214,153 | B1 | 4/2001 | Chess |
| 6,294,237 | B1 | 9/2001 | Popat |
| 6,327,048 | B1 | 12/2001 | Wen |
| 6,374,088 | B1 | 4/2002 | Gustafsson |
| 6,392,680 | B2 | 5/2002 | Akada et al. |
| 6,416,835 | B1 | 7/2002 | Preston et al. |
| 6,471,056 | B1 | 10/2002 | Tzeng |
| 6,484,901 | B1 | 11/2002 | Kim |
| 6,488,425 | B1 | 12/2002 | Spence et al. |
| 6,503,605 | B1 | 1/2003 | Paul-Lieberman |
| 6,504,928 | B1 | 1/2003 | Toyooka |
| 6,559,970 | B1 | 5/2003 | Yamamoto et al. |
| 6,561,547 | B2 | 5/2003 | Attia et al. |
| 6,572,151 | B2 | 6/2003 | Jarvis et al. |
| 6,577,922 | B2 | 6/2003 | Gadrix et al. |
| 6,594,472 | B1 | 7/2003 | Curtis et al. |
| 6,608,996 | B1 | 8/2003 | Laurikka et al. |
| 6,619,166 | B2 | 9/2003 | Miyazaki et al. |
| 6,628,971 | B1 | 9/2003 | Yoon et al. |
| 6,630,228 | B1 | 10/2003 | Jarnebrink |
| 6,649,817 | B2 | 11/2003 | Hartill |
| 6,665,587 | B2 | 12/2003 | Leone et al. |
| 6,667,738 | B2 | 12/2003 | Murphy |
| 6,684,087 | B1 | 1/2004 | Ye et al. |
| 6,694,133 | B1 | 2/2004 | Tobita et al. |
| 6,704,120 | B1 | 3/2004 | Leone et al. |
| 6,714,204 | B2 | 3/2004 | Ishida et al. |
| 6,727,909 | B1 | 4/2004 | Matsumura et al. |
| 6,731,913 | B2 | 5/2004 | Humphreys et al. |
| 6,751,487 | B1 | 6/2004 | Rydbeck et al. |
| 6,761,791 | B2 | 7/2004 | Arway et al. |
| 6,800,167 | B1 | 10/2004 | Frazer |
| 6,810,262 | B2 | 10/2004 | Kim |
| 6,860,050 | B2 | 3/2005 | Flynn et al. |
| D522,064 | S | 5/2006 | Trigg et al. |
| D522,066 | S | 5/2006 | Trigg et al. |
| 2001/0010838 | A1 | 8/2001 | Eldon |
| 2001/0029193 | A1 | 10/2001 | Ishigaki |
| 2002/0047263 | A1 | 4/2002 | McCarthy et al. |
| 2002/0055373 | A1 | 5/2002 | King et al. |
| 2002/0055986 | A1 | 5/2002 | King et al. |
| 2002/0055992 | A1 | 5/2002 | King et al. |
| 2002/0059406 | A1 | 5/2002 | Tanaka |
| 2002/0065578 | A1 | 5/2002 | Leone et al. |
| 2002/0076512 | A1 | 6/2002 | Kreider |
| 2002/0096874 | A1 | 7/2002 | Viby |
| 2002/0100387 | A1 | 8/2002 | Churchwell |
| 2003/0068035 | A1 | 4/2003 | Pirila et al. |
| 2003/0071886 | A1 | 4/2003 | Chang |
| 2003/0078078 | A1 | 4/2003 | King et al. |
| 2003/0078079 | A1 | 4/2003 | King et al. |
| 2003/0083108 | A1 | 5/2003 | King et al. |
| 2003/0083109 | A1 | 5/2003 | King et al. |
| 2003/0089083 | A1 | 5/2003 | Phillips |
| 2003/0134613 | A1 | 7/2003 | Latto et al. |
| 2003/0157287 | A1 | 8/2003 | Song |
| 2003/0161672 | A1 | 8/2003 | Roberson |
| 2003/0168148 | A1 | 9/2003 | Gerber et al. |
| 2003/0189654 | A1 | 10/2003 | Kage et al. |
| 2003/0201983 | A1 | 10/2003 | Jokinen et al. |
| 2003/0207063 | A1 | 11/2003 | Jarvis et al. |
| 2003/0211835 | A1 | 11/2003 | Pan et al. |
| 2004/0088656 | A1 | 5/2004 | Washio |
| 2004/0091659 | A1 | 5/2004 | Banks et al. |
| 2005/0012324 | A1 | 1/2005 | Rousselet |
| 2006/0037507 | A1 | 2/2006 | Trigg et al. |
| 2006/0062953 | A1 | 3/2006 | Trigg et al. |

FOREIGN PATENT DOCUMENTS

| | | |
|---|---|---|
| DE | 20104924 | 10/2001 |
| EP | 0529094 A1 | 3/1993 |
| EP | 0790730 B1 | 8/1997 |
| EP | 0932288 A1 | 7/1999 |
| EP | 0988998 A1 | 3/2000 |
| EP | 1182850 A1 | 2/2002 |
| EP | 1316978 A1 | 6/2003 |
| EP | 1 376 516 A1 | 1/2004 |
| JP | 11-177661 | 7/1999 |
| JP | 2000-138738 | 5/2000 |
| JP | 2000-299722 | 10/2000 |
| JP | 2002/040952 | 2/2002 |
| WO | WO 95/34879 A1 | 12/1995 |
| WO | WO 96/15746 | 5/1996 |
| WO | WO 98/17088 A1 | 4/1998 |
| WO | WO 99/15334 A1 | 4/1999 |
| WO | WO 99/40706 A1 | 8/1999 |
| WO | WO 99/66694 A1 | 12/1999 |
| WO | WO 02/11507 A1 | 2/2002 |
| WO | WO 02/26483 A1 | 4/2002 |
| WO | WO 02/060667 A1 | 8/2002 |
| WO | WO 02/098662 A1 | 12/2002 |
| WO | WO 03/061250 A1 | 7/2003 |
| WO | WO 2006/019704 A1 | 2/2006 |
| WO | WO 2006/023181 A2 | 3/2006 |

OTHER PUBLICATIONS

"User's Guide for Nokia 3200," 9356881, Issue 1, pp. 1-25.
U.S. Appl. No. 10/925,118, filed Aug. 23, 2004, Jerry G. Hodsdon.
PCT Search Report, Sep. 11, 2006.
Written Opinion dated Oct. 18, 2007 from corresponding International Application No. PCT/US2006/014073.
International Preliminary Report on Patentability dated Oct. 23, 2007 from corresponding International Application No. PCT/US2006/014073.
Office action dated Mar. 16, 2010 from corresponding European Application No. 06750182.5.
Office action dated Oct. 16, 2009 from corresponding Chinese Application No. 200680017743.3.
Response dated Sep. 27, 2010 from corresponding European Application No. 06750182.5.

* cited by examiner

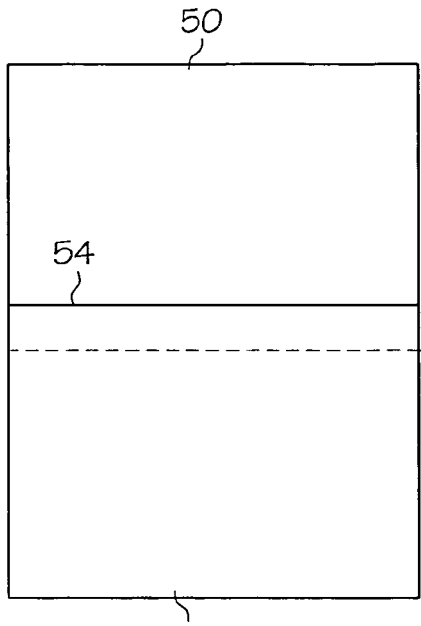 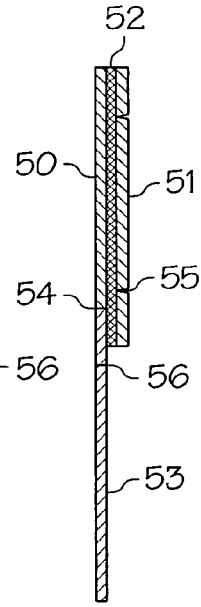 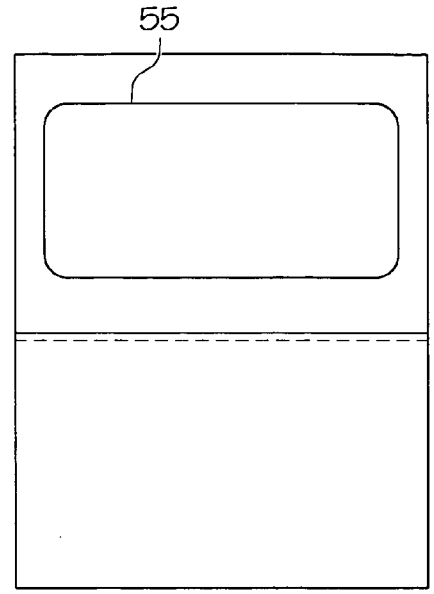
FIG. 1A   FIG. 1B   FIG. 1C
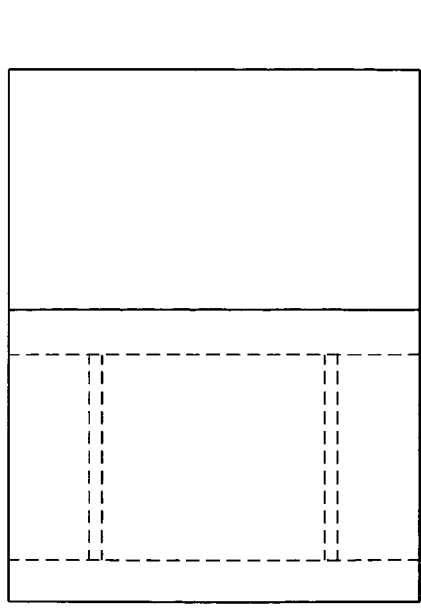 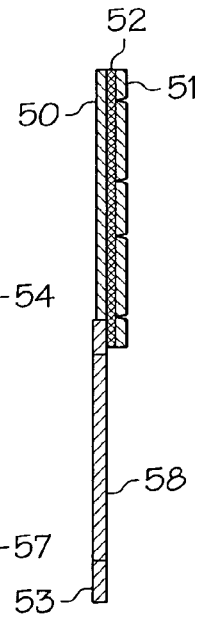 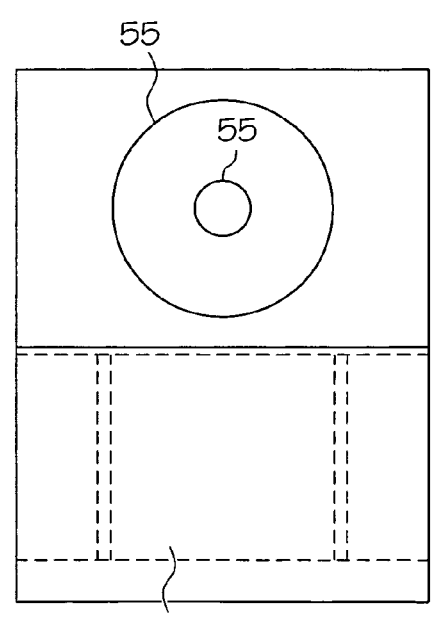
FIG. 2A   FIG. 2B   FIG. 2C

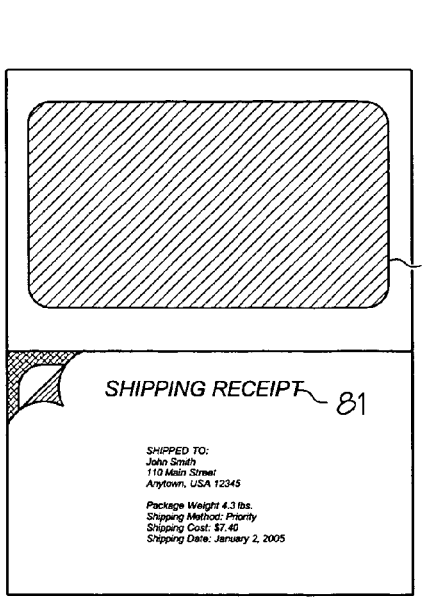
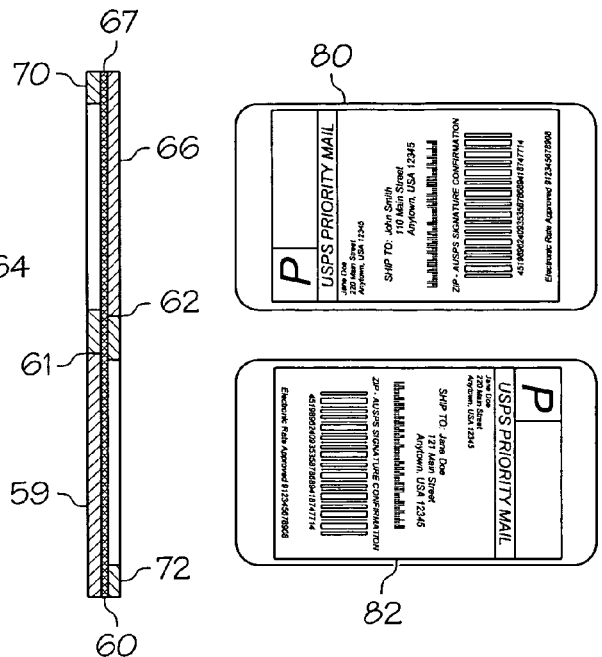
FIG. 9A  FIG. 9B  FIG. 9C
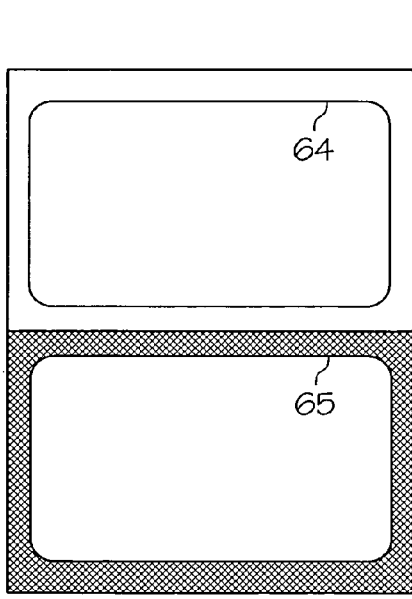
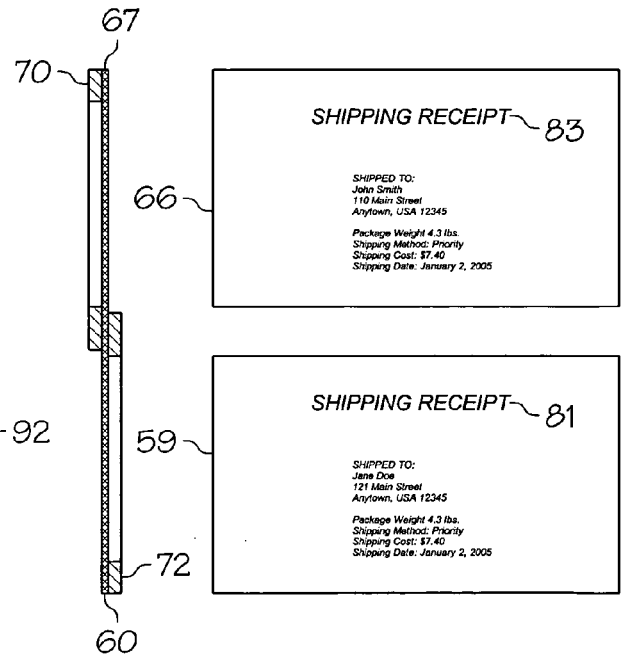
FIG. 10A  FIG. 10B  FIG. 10C

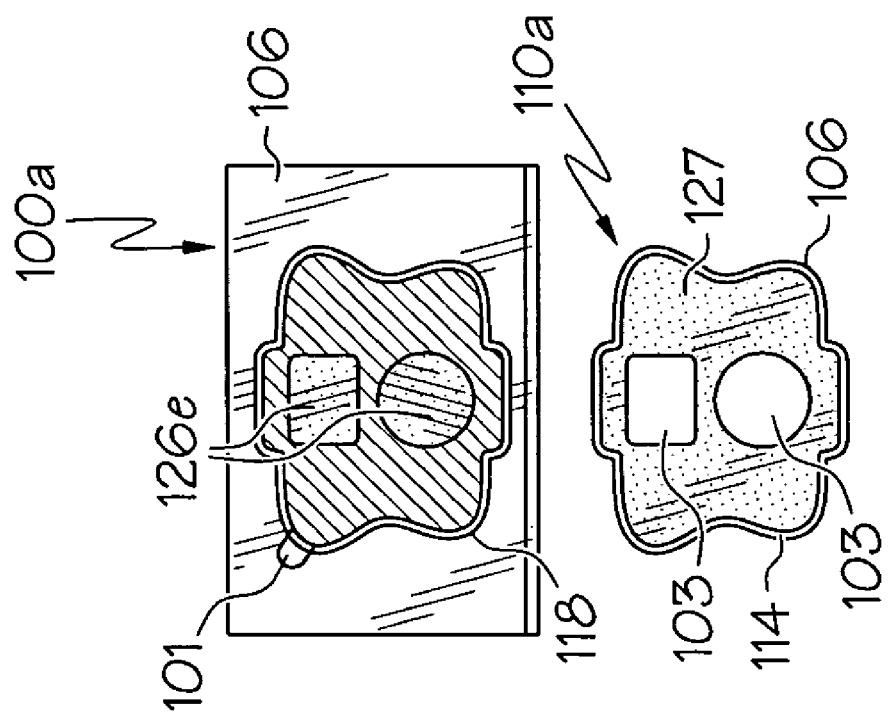
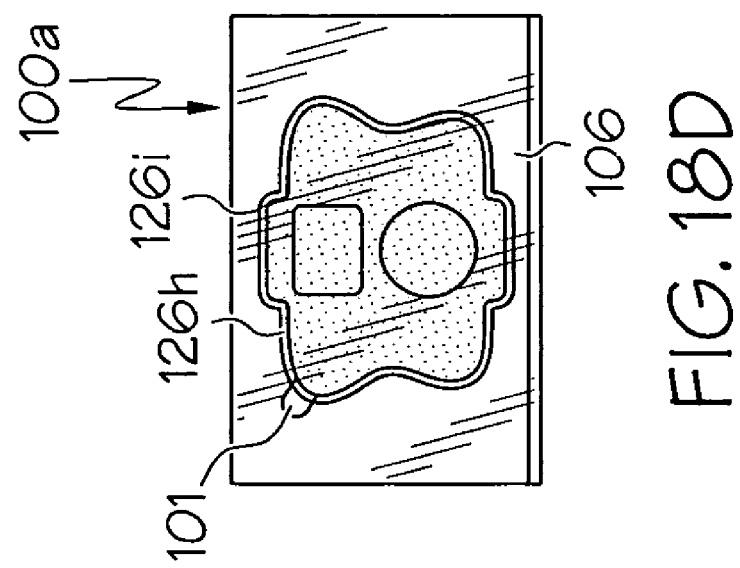

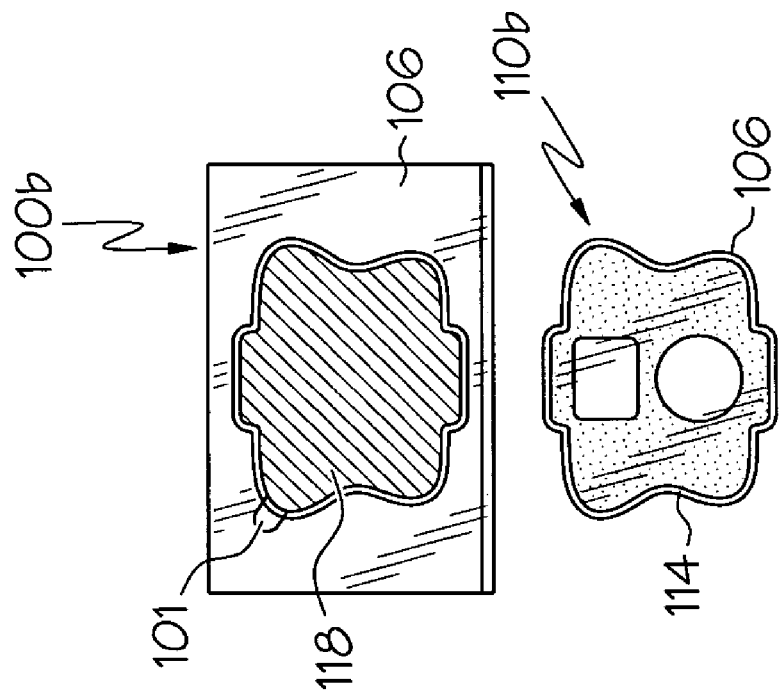
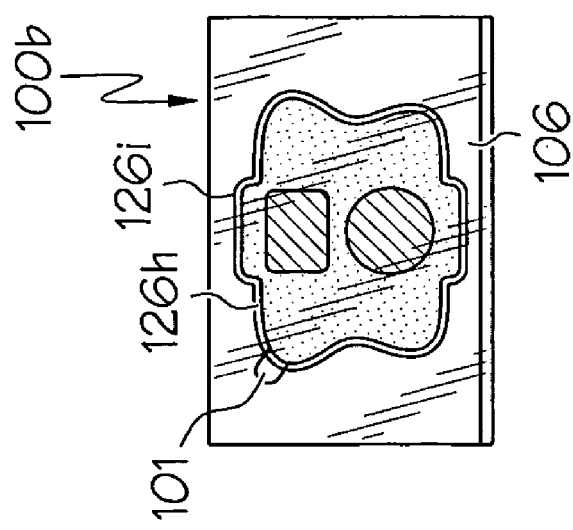
FIG. 19E
FIG. 19D

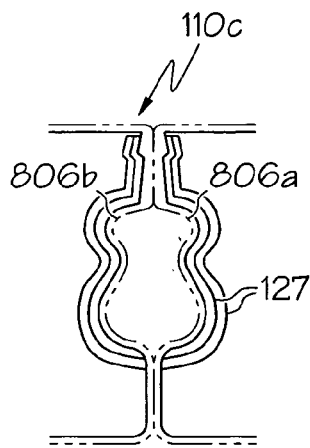
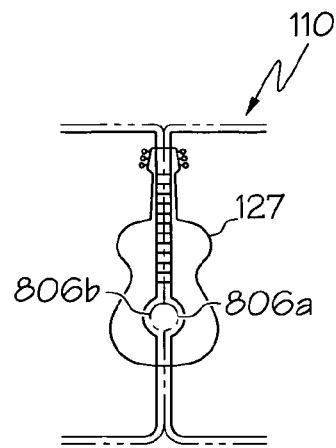
FIG. 20E  FIG. 20F
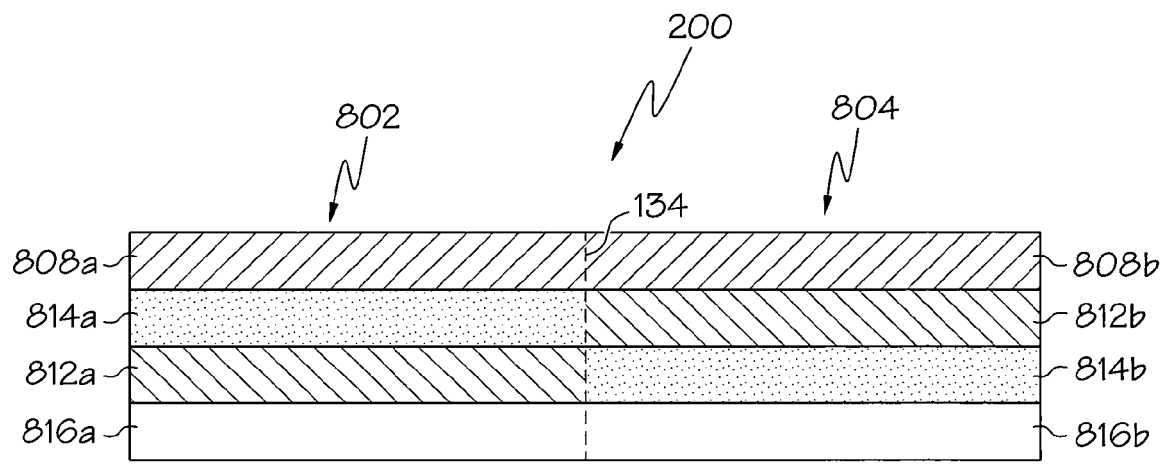
FIG. 21
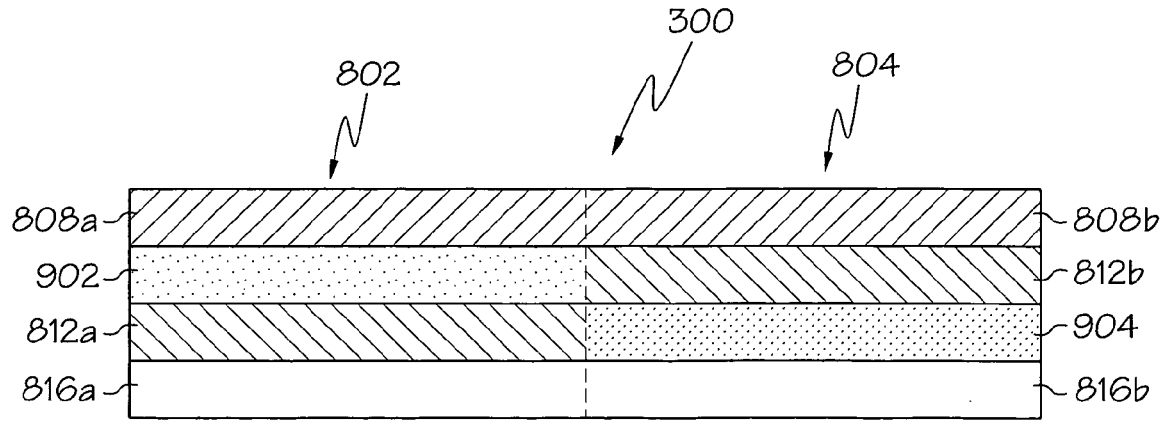
FIG. 22

MOBILE DEVICE LABEL WITH NEGATIVE IMAGE FEATURE

CROSS-REFERENCES TO RELATED APPLICATIONS

This application claims the benefit of U.S. Provisional Application No. 60/672,620, filed Apr. 18, 2005, the entire contents of which are hereby incorporated by reference in their entirety herein.

TECHNICAL FIELD

The present invention generally relates to adhesive labels and, more particularly, relates to adhesive labels that include printable surfaces.

BACKGROUND

Adhesive labels are commonly used to decorate or provide information on various objects and surfaces. Some adhesive labels are preprinted before being sold so a purchaser can readily adhere the adhesive labels to various surfaces as desired. Other adhesive labels, such as shipping labels, are partly printed before being sold to a purchaser, and a purchaser adds additional handwritten or printed information to the adhesive labels following purchase. Still other labels are simply manufactured and sold without any printing, and are then printed upon by the purchaser following purchase.

Shipping labels are one of several applications for which it may be desirable to combine more than one construction onto a single sheet. A common example of a multiple-construction sheet has a data portion that is desktop printer-compatible, and another portion that includes an adhesive label. For many of such multiple-construction sheets, the adhesive label portion is also desktop printer-compatible. For such sheets, the data portion and the adhesive label portion can be printed at the same time. A multiple-construction sheet is helpful when the data for both the data portion and the adhesive label portion are related, such as when it is desirable to print a shipping label and a corresponding packing list onto the same sheet and keep the two portions together.

Conventional methods of forming sheets having more than one construction are described in U.S. Pat. Nos. 6,071,585 and 6,514,588. The methods are performed using a specially modified converting press that is adapted to form release coating and adhesive coating layers on a sheet. A release agent is first applied to a portion of a printable sheet. Then, an adhesive layer is applied over all or most of the release agent, and the adhesive layer is covered with a printable face material to form an adhesive label region. Alternatively, the adhesive layer is first applied to the printable face material, and the release agent is covered with the adhesive side of the printable face material to form the adhesive label region. After forming the adhesive label using either method, the face material is die cut to form one or more labels.

Another method of forming sheets having more than one construction is described in U.S. Pat. No. 6,379,488. According to that method, adhesive is applied to the back side of a portion of a printable sheet, and then covered by a solid layer, a silicon layer, or a paper or film that includes a release agent that contacts the adhesive to form an adhesive label region. The adhesive label region is then die cut into one or more labels, and the original printable sheet becomes the label face material.

Yet another method of forming sheets having more than one construction includes selectively applying a release agent to a layer of an adhesive laminate construction prior to lamination. The adhesive permanently bonds a portion of the construction, and the release agent portion forms an adhesive label region that can be die cut to form one or more labels. The method requires the use of two layers of material, which is costly and sometimes unnecessary or wasteful. Further, all of the above-described methods utilize equipment that is costly, and modification of a press to perform these methods can be a relatively slow and inefficient process.

Another challenge in producing adhesive labels is the frequent need for the labels to include exterior surface protection that makes the adhesive labels more durable. Overprint coatings and surface laminates are two types of exterior surface protection that increase durability. However, the protective nature of many coatings and laminates prevents future marking or printing on the protected surface. Consequently, when coatings or laminates are added to an adhesive label, a purchaser is unable to easily add handwritten or printed information to the preprinted text or graphics thereon.

One way that some consumers have been able to print onto an adhesive label is through use of a desktop printer. The most common desktop printing technology employed by consumers today is inkjet, which in some cases provides text and images that are of a sufficiently adequate quality to meet consumer expectations and needs. However, the consumer-printed adhesive labels may exhibit certain drawbacks, particularly for applications in which relatively high durability is desired. For example, personal sporting goods and personal electronic devices may require highly durable adhesive labels. In such instances, consumer-printed adhesive labels may not provide adequate water resistance, or sufficient rub, scratch, and abrasion resistance. The consumer-printed adhesive labels may also suffer image fading if the labels are exposed to ultraviolet light, or to various gases in the environment.

Inkjet printer and inkjet printable media manufacturers have made improvements relating to adhesive label water resistance through the development of inkjet topcoatings and improved pigment-based inkjet inks. However, the improved color inkjet inks are still often insufficiently resistant to water exposure, and topcoating development has only proven to be partially successful in improving water resistance.

Other laminated papers and card products that are designed for desktop printing include the feature of a laminated end product with improved water, abrasion, and fade resistance, but such products typically do not include an adhesive surface that would be an important part of a pressure-sensitive label. Another printed product is a self-laminating sign, which provides both lamination of the desktop printed product and pressure-sensitive adhesive label performance. However, the adhesive in such a self-laminating sign is typically disposed about the sign perimeter. In certain circumstances, the perimeter of adhesive provides insufficient adhesion to curved or otherwise irregular surfaces, or for labels that are subject to significant abrasion or handling. In addition, the size of the sign is generally too large for placement on relatively small devices such as personal music players or the like.

As previously mentioned, decorative adhesive labels are sometimes completely preprinted, partially preprinted, or left blank for post-purchase printing, depending on the intended use for the label and the type of device with which the label is used. Although adhesiveness, printability, and other previously-described features are important for an intended user, decorative options are commonly limited to the colors and/or printing on the various labels. A sometimes overlooked but useful feature is an adhesive label's shape. There are numerous ways to shape an adhesive label to fit on various devices while enhancing the visual appeal of both the label and the device on which the label is adhered.

Accordingly, there is a need for adhesive labels that are adapted for use with particular surfaces and devices, and that are shaped to enhance their visual appeal. There is also a need for adhesive labels that include an exterior printed surface protecting agent without impeding a purchaser from easily adding handwritten or printed information to the labels. It is also desirable to efficiently produce adhesive labels that include a multiple-construction sheet, and particularly a multiple-construction sheet that includes a printed surface protecting agent. Furthermore, other desirable features and characteristics of the present invention will become apparent from the subsequent detailed description and the appended claims, taken in conjunction with the accompanying drawings and the foregoing technical field and background.

BRIEF SUMMARY

To satisfy the previously-described needs and others, an adhesive label is provided, the adhesive label having a shape that is configured to be wrapped around an apparatus and to outline a predetermined image having first and second components. The label comprises a first facestock having an inner and an outer surface, and opposite first and second edges that come into proximity with one another when the adhesive label is wrapped around the apparatus. The first edge includes first contours that outline the first component of the predetermined image. The second edge includes second contours that outline the second component of the predetermined image. The label further comprises a release liner, and a first adhesive adhering the release liner to the first facestock inner surface.

A multilayer sheet assembly is also provided. The sheet assembly comprises the adhesive label wherein the first facestock inner surface includes a lined portion that is covered by the first release liner, and an unlined portion that is not covered by the first release liner, the first adhesive being coated over both the lined and unlined portions of the first facestock inner surface. The sheet assembly further comprises a second facestock including an overlapping portion. The overlapping portion covers at least some of the unlined portion of the first facestock inner surface, and is adhered thereto using at least the first adhesive.

A method of applying printed matter to the adhesive label is also provided to satisfy the previously-described needs and others. The method comprises printing the first facestock of the adhesive label with the printed matter. The first and second edges of the adhesive label cooperate with the printed matter to enhance the predetermined image when the label is wrapped around the apparatus. In one embodiment, the printed matter defines a third component of the predetermined image when the label is wrapped around the apparatus

BRIEF DESCRIPTION OF THE DRAWINGS

The present invention will hereinafter be described in conjunction with the following drawing figures, wherein like numerals denote like elements, and FIGS. 1A to 1C are rear, front, and side views, respectively, of a multilayer sheet assembly including a multilayered web attached to a single-layered facestock, the web including a diecut defining an adhesive label;

FIGS. 2A to 2C are rear, front, and side views, respectively, of a multilayer sheet assembly including a multilayered web attached to a single-layered facestock, the web including a diecut defining a compact disc or digital video disc label, and the single-layered facestock including cuts, creases, and perforations to form a jewel case insert;

FIGS. 9A to 9C are rear, front, and side views, respectively, of the multilayer sheet assembly from FIGS. 8A to 8C, with the printed adhesive labels removed from the webs;

FIGS. 10A to 10C are rear, front, and side views, respectively, of the multilayer sheet assembly from FIGS. 8A to 8C, with the printed adhesive labels and the printed release liners removed from the webs;

FIGS. 18A to 18E are top views of a multilayer sheet assembly being printed, folded, and separated to form a self-laminated adhesive label;

FIGS. 19A to 19E are top views of another multilayer sheet assembly being printed, folded, and separated to form a self-laminated adhesive label;

FIGS. 20C to 20F are top views of the opposite ends of an adhesive label formed from the multilayer sheet of FIG. 20A; and FIGS. 21 to 24 are side views of exemplary multilayer sheet assemblies, each including a self-laminating adhesive label.

DETAILED DESCRIPTION

Figure 3:
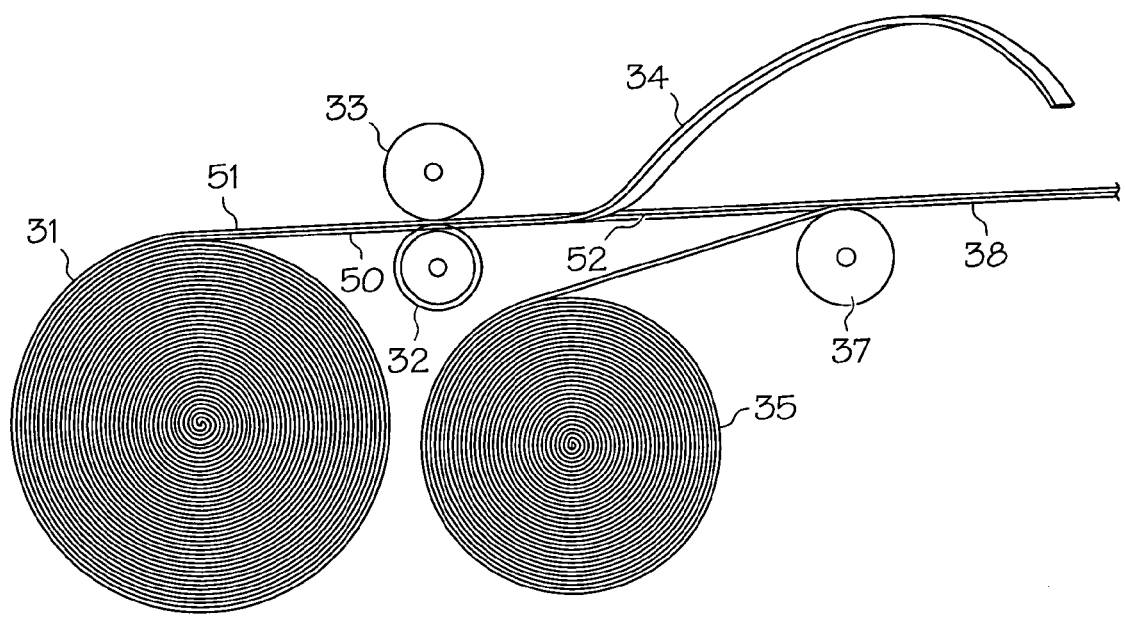
FIG. 3 is a side view of a roll converting press adapted to manufacture a multilayer sheet assembly.

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

In the following description, a facestock is a sheet that may be formed from various materials including a printable material and a transparent material that may or may not be printable. A web is a multilayered laminated sheet, or a portion thereof, that at least initially includes at least three components: a release liner, a facestock, and an adhesive disposed between the release liner and the facestock.

Each of the subsequently-described sheets includes at least one web portion; some embodiments incorporate a plurality of different webs that are uniquely combined to form a sheet, and others incorporate a single web portion uniquely combined with a single-layered portion to form a sheet.

FIGS. 1A to 1C are top, side, and rear views, respectively, of a sheet that includes a web portion combined with a single-layered portion. As depicted in FIG. 1B, the web portion includes a release liner 50, a printable facestock 51, and an adhesive 52. The single-layered portion 53 is a facestock that may be paper, card stock, a transparent material, or some other material. The single-layered portion 53 overlaps and is bonded to the facestock 51 and adhesive 52, and abuts or comes in close proximity to the release liner 50 at point 54. It is preferable that the single-layered portion 53 abuts, but does not overlap with, the release liner 50. The printable facestock 51 includes a die cut 55 that defines one or more labels. Although not illustrated, the single-layered portion 53 may include a die cut as well. In addition, a perforation 56 is included to allow for separation of the web from the single-layered portion 53. For example, after desktop printing the single-layered portion 53 may be easily separated and removed from the web for record keeping or documentation purposes. The sheet may also include other features such as printing, embossing, microperforations, and so forth.

FIGS. 2A to 2C depict another exemplary sheet that includes a web combined with a single-layered portion to produce a compact disc (CD) or digital video disc (DVD) combined label and jewel case insert. Many conventional jewel case inserts are made of a card type of material. Other jewel case inserts are made entirely from a multi-layered sheet. For example, U.S. Pat. No. 6,481,572 discloses a multi-layered sheet that includes a label designed for application to a CD or a DVD, and a jewel case insert formed by microperforations on a separate section of the sheet.

The exemplary CD/DVD combined label and jewel case insert depicted in FIGS. 2A to 2C includes a web having die cuts 55, and a single-layered portion 53 formed from a paper or card type of facestock. Various cuts, creases, and perforations 57 in the single-layered portion 53 are used to form the jewel case insert 59. The CD/DVD combined label and jewel case insert may also include non-illustrated features as tabs and alignment guides, printing, and embossing.

Numerous other embodiments may be produced using the sheet that includes a web portion combined with a single-layered portion. The embodiments include but are not limited to informational sheets with attached identification labels, identification cards, or self-laminating identification cards, medical information with prescription labels, two sided adhesive label and printable form combinations, and so forth.

An exemplary method of manufacturing sheets that include a web portion combined with a single-layered portion, such as those depicted in FIGS. 1 and 2, utilizes a roll converting press. The roll converting press cuts and removes a strip of the release liner 50 to expose a portion of the adhesive 52. The press then presses the single-layered portion 53 onto the exposed adhesive 52. The resulting unified sheet is held together by the adhesive 52. It will be appreciated that this is merely exemplary of one method of forming a sheet having a web portion and a single-layered portion. Further, as subsequently described, similar methods may be used to form a sheet having a plurality of web portions.

The laminate web that is used to produce the adhesive label sheets may be produced using a continuous web coating machine that is adapted to run material widths that exceed six feet, at speeds exceeding 1,000 feet per minute. The material may then be slit to the desired widths for conversion into adhesive label sheets. To efficiently convert the material into label sheets that are compatible with desktop printers, the material width may be a multiple of one of the dimensions of the sheet, such as 8½ inch, 11 inch, 17 inch, 22 inch, or 210 mm or 297 mm for A4. The material width may exceed a multiple of one of the dimensions by a small amount to improve the reliability or ease of conversion, and excess material is trimmed to size during the conversion process.

A label converting machine, hereinafter referred to as a press, may use a single roll of label material that is unwound and run as a continuous web through the press. The press may be adapted to guide, de-curl, print, die cut, emboss, perforate, score, and slit the label material. The press may also be adapted to remove a portion of a face material, and then cut the label material to length and stack the label material. Some converting presses may also include more than one unwinding mechanism and material web. An additional unwinding mechanism enables two parallel and identical webs of material to be run through the press at the same time, and also enables a separate layer of material, such as an overlaminate, to be added to the web.

An exemplary sheet production method utilizes a roll converting press that includes more than one roll unwinding device. The method bonds a web and a single-layered material, or two webs of material, to form a single sheet that has a final width that approximates one of the product sheet dimensions, such as 11 inch or 8½ inch.

An exemplary roll converting press is depicted in FIG. 3, along with a sheet production method using the press. A roll of a first laminate web 31 includes a printable facestock 51, an adhesive 52, and a release liner 50. The web 31 is passed between a slitting wheel 32 and an anvil roll 33 with the facestock 51 adjacent to the anvil roll 33, and the release liner 50 adjacent to the slitting wheel 32. The slitting wheel 32 is positioned a fixed distance from the anvil roll 33 in order for the release liner 50, but not the facestock 51, to be cut. A narrow strip 34 of release liner produced by the slitting wheel 32 is then removed to expose a portion of the adhesive 52. A second material 35 from a separate roll is then merged with the web 31 using an idler or nip roller 37. The second material 35 in the present embodiment is a single-layered material such as the single-layered material 53 depicted in FIGS. 1 and 2. However, the second material 35 may be a web of material, as will be subsequently discussed in detail. An edge of the second material 35 is positioned to abut the remaining release liner 50 when the second material 35 merges with the web 31. The exposed adhesive 52 bonds the second material 35 to the web 31 to form the finished new sheet construction 38, which may then be die cut, printed, perforated, sheeted, stacked, and so forth.

It is preferable to have little or none of the adhesive 52 exposed after the web 31 and the second material 35 are merged together. It is also preferable that the second material 35 does not overlap the release liner 50 from the web 31. Thus, the edge of the release liner 50 and the edge of the second material 35 should be accurately positioned with respect to one another, as depicted in the embodiments illustrated in FIGS. 1 and 2.

Figure 4:
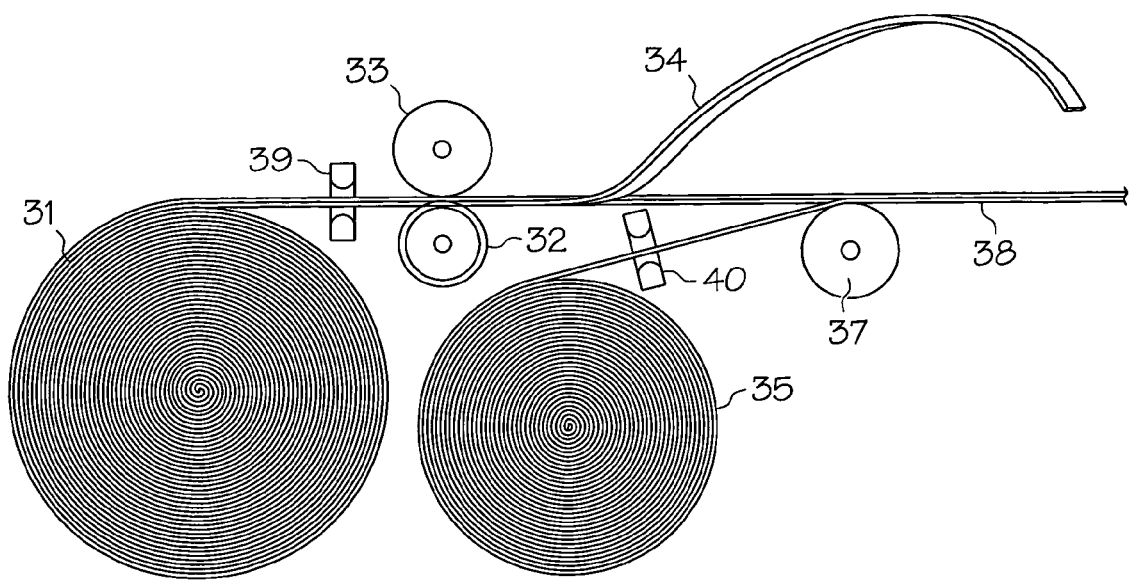
FIG. 4 is a side view of a roll converting press adapted to manufacture a multilayer sheet assembly, the press having web positioning guides.

In another embodiment depicted in FIG. 4, web guides 39, 40 may be used to accomplish accurate positioning of the release liner 50 and the second material 35 so that little or none of the adhesive 52 is exposed after the web 31 and the second material 35 are merged together. The web guides 39, 40 incorporate an edge sensor that either optically or pneumatically senses the position of a web edge. Upon detecting an edge, the edge sensors 39, 40 activate respective control systems to position the web 31. One positioning method includes laterally moving an entire roll as needed. Another positioning method utilizes two sets of rollers on a web guide that includes a pivot offset from a web.

Figure 5:
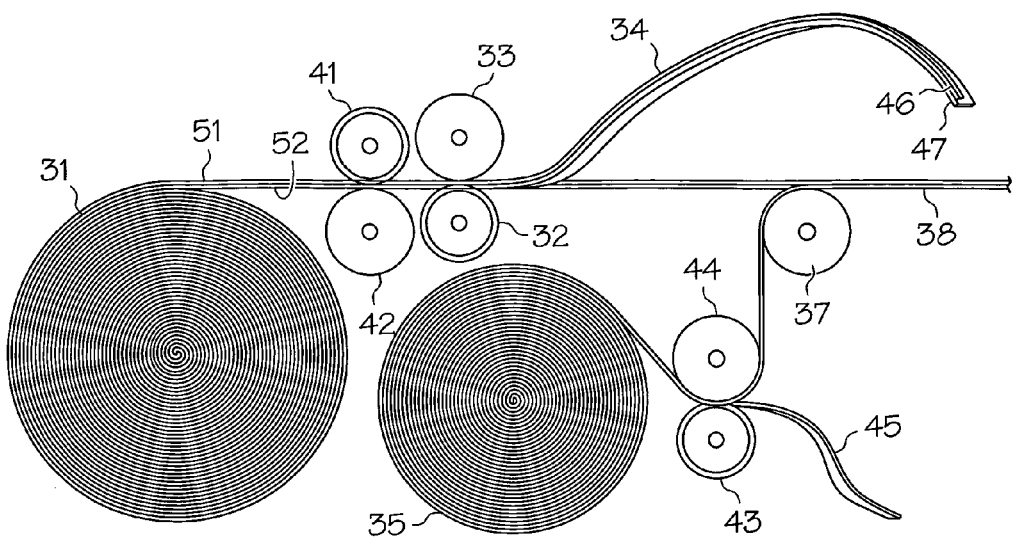
FIG. 5 is a side view of another exemplary roll converting press adapted to manufacture a multilayer sheet assembly.

Another exemplary roll converting press that aligns the edges of the two webs is depicted in FIG. 5. The first web 31 is passed between a slitting wheel 32 positioned a fixed distance from an anvil roll 33 with the facestock 51 adjacent to the anvil roll 33, and the release liner 50 adjacent to the slitting wheel 32. The slitting wheel 32 is positioned a fixed distance from the anvil roll 33 in order for the release liner 50, but not the facestock, to be cut a set distance from a web outer edge. Another slitting wheel 41 is positioned upstream from the slitting wheel 32, and is further positioned a fixed distance from an anvil roll 42. The slitting wheel 41 cuts the facestock 51 from the first web 31, but not the release liner 50, at a position that is offset toward the web outer edge, with respect to the release liner slit produced by the slitting wheel 32. The edge strip 34 is removed, and includes the facestock strip 46 and the release liner strip 47 produced by the slitting wheels 32, 41. The position of the two slitting wheels 32, 41 define the release liner and facestock edges. A slitting wheel 43 positioned a fixed distance from an anvil roll 44 removes a strip 45 of the second material. The position of the slitting wheel 43 defines the abutting edge of the second material 35. Since the slitting wheel positions are fixed, the positions of the first and second web abutting edges are controlled to minimize exposed adhesive and to eliminate overlap of the web release liner 50 with the second material 35.

As understood from the preceding description, the exemplary roll converting presses, heretofore and hereafter described in conjunction with various sheet production methods, enable the combination of an adhesive-containing web with other facestock materials including paper, card stock, and film laminates. The roll converting presses also enable the efficient and simple production of multiple-web sheets, and also two-sided and self-laminating label and form combinations, as will be described in detail subsequently. The roll converting presses consequently increase the number of possible sheet constructions that can be readily and efficiently produced. The presses do not require adhesive and release coating equipment. The reduction of necessary equipment improves overall press efficiency and production costs for both the equipment and the adhesive label sheets. In addition, the presses enable the use of certain adhesives such as emulsion or solvent adhesives, and certain release agents such as solvent or electronic beam-cured release agents, which cannot be applied on paper using many conventional presses. The ability to select from a broad selection of web materials and sizes, sheet materials and sizes, adhesives, and release agents allows a manufacturer to minimize the cost of materials.

Although each of the previously-described sheets includes just one web portion, other embodiments incorporate a plurality of different webs that are uniquely combined into a sheet. Some exemplary multiple-web sheets are depicted in FIGS. 6 to 10.

Figures 6A, 6B, 6C:
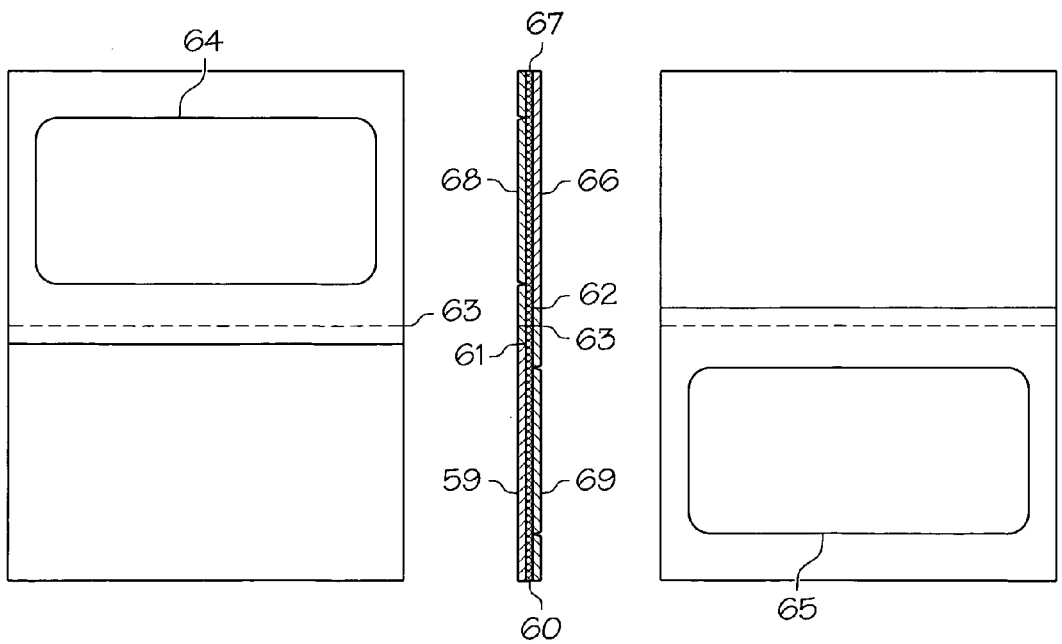
FIGS. 6A to 6C are rear, front, and side views, respectively, of a multilayer sheet assembly including two multilayered webs attached together, each web including a diecut defining an adhesive label.

One example of a sheet having a multiple web construction is the two-sided label and form combination depicted in FIGS. 6A to 6C. A first web of facestock 68, a release liner 66 and adhesive 67 forms half of the construction. A nearly identical, but inverted web forms the other half of the construction, the inverted web including facestock 69, a release liner 59, and adhesive 60. A small section of release liner 66 is removed, and the previously underlying adhesive 67 is covered with and adhered to an extending portion of the facestock 69 from the inverted web so the facestock 69 abuts the release liner 66 at a point 62 one side of the sheet. Likewise, the facestock 68 abuts the release liner 59 from the inverted web at a point 61 on an opposite side of the sheet. The overall sheet consequently has an approximately uniform thickness, with the slight exception of any overlapped adhesives from the two webs. Because the adhesive layers are thin and compressible, any overlapped adhesives create a merely marginal difference in thickness.

The sheet includes at least one die cut label 64 through at least the facestock 68 from the first web. Similarly, at least one die cut label 65 is formed through at least the facestock 69 from the inverted web. In the illustrated embodiment, the sheet includes a perforation 63 to ease separation of the top and bottom halves if desirable. For example, a shipping receipt corresponding to an adhesive label may be printed above or below the adhesive label. After the adhesive labels have been printed, removed and applied, the sheet may be separated to provide two separate receipts or packing slips. The two-sided sheet having at least two labels and two receipts per sheet also substantially reduces the amount of label stock required per sheet, and the amount of waste after the adhesive labels are used.

Figure 7A:
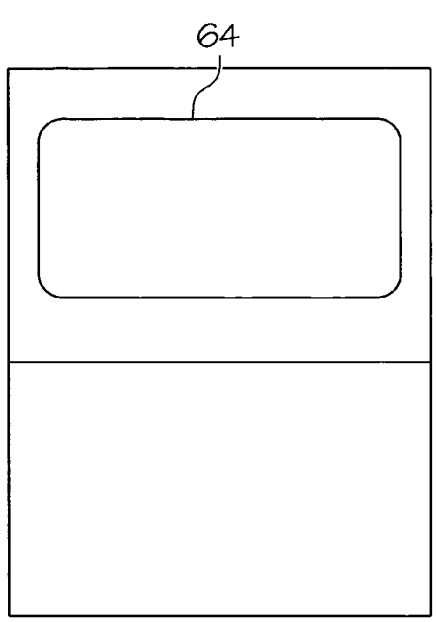
FIGS. 7A to 7C are rear, front, and side views, respectively, of a another multilayer sheet assembly including two multilayered webs attached together, each web including a diecut defining an adhesive label.
Figure 7B:
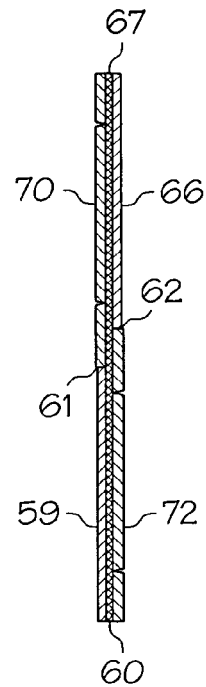
Figure 7C:
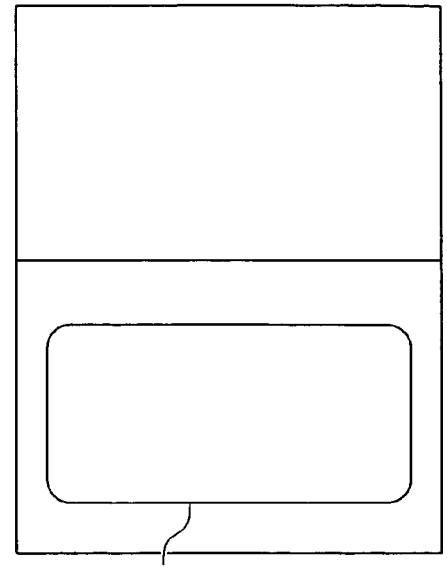

FIGS. 7A to 7C depict some variations from the embodiment depicted in FIGS. 6A to 6C. FIG. 7B illustrates the sheet having facestock materials 70, 72 that are thicker than the release liners 59, 66. Also, there is no perforation separating the two webs.

FIGS. 8 to 10 depict a method of using adhesive shipping labels and shipping receipts that are formed on sheets that include a plurality of webs, such as those depicted in FIGS. 6 and 7. Although the sheets resemble the particular embodiment depicted in FIG. 7, with a sheet lacking a perforation for separating two webs, the method may be readily applied for use with the embodiment illustrated in FIG. 6 having a perforation in the sheet.

Figure 8A:
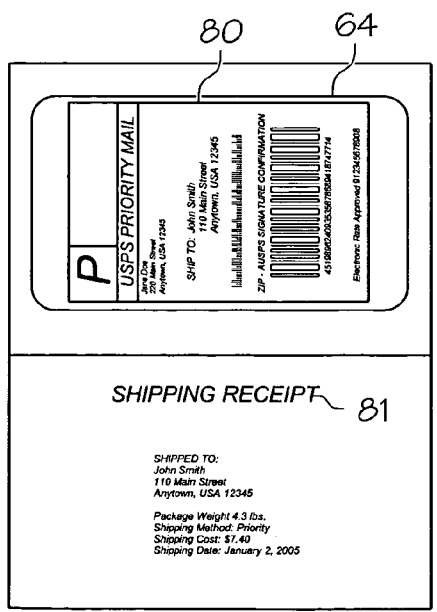
FIGS. 8A to 8C are rear, front, and side views, respectively, of a multilayer sheet assembly including two multilayered webs attached together, each web including a diecut defining an adhesive label with printing thereon, and a corresponding release liner having printing thereon.
Figure 8B:
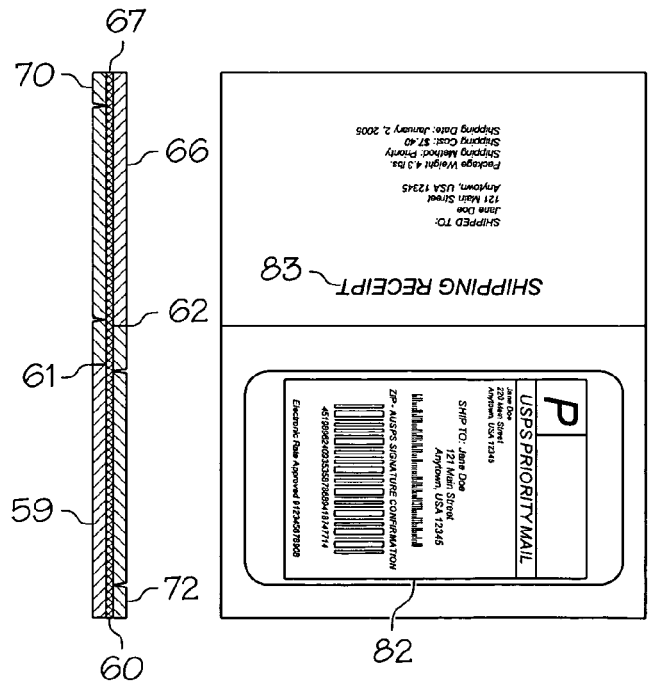
Figure 8C:
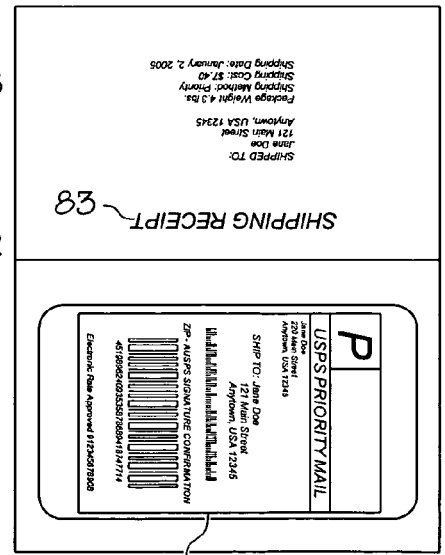

Turning now to FIGS. 8A to 8C, a shipping label 80 and a corresponding receipt or packing slip 81 are printed on one side of the sheet, and a second shipping label 82 and a corresponding receipt or packing slip 83 are printed in the inverse position on an opposite side of the sheet. The labels 80, 82 are formed from the diecuts 64, 65 in the facestocks 70, 72.

As depicted in FIGS. 9A to 9C, the labels 80, 82 are removed from the sheet for application to the packages to be shipped, leaving the two receipts 81, 83 on the sheet. FIGS. 10A to 10C depict the receipts 81, 83 peeled away from the sheets, leaving waste material 92 that consists of facestocks 70, 72 bound together by the adhesives 60, 67.

Before describing further embodiments of sheets that include multiple webs, an exemplary method of manufacturing multiple web sheets will be described. According to the method, two webs of pressure sensitive laminate are run through a roll converting press instead of a web and a single-layered material. When two webs are combined using the press, one web is run with the facestock side up, and the other web is run with the release liner side up. A release liner strip is removed from at least one web prior to combining the two webs. Preferably, the release liner strips are removed from both webs prior to combining the webs so an overlap area where the webs are combined is nearly identical in thickness to the rest of the web portions, differing only by approximately the thickness of the extra layer of adhesive in the overlap. It will be appreciated that more than two webs may be combined utilizing a similar method to produce smaller sheets, or to produce sheets with more than two different constructions per sheet.

Figure 11:
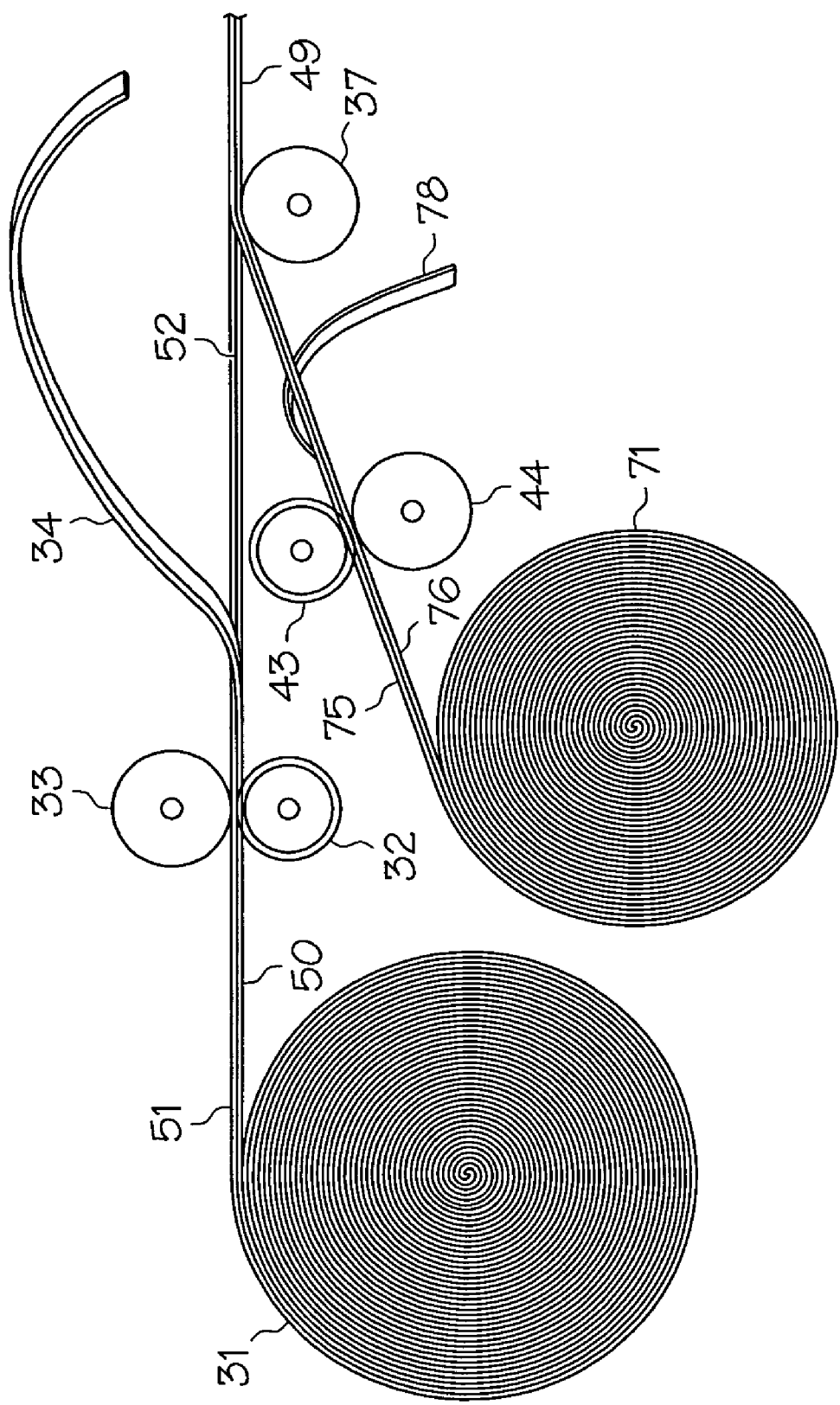
FIG. 11 is a side view of another exemplary roll converting press adapted to manufacture a multilayer sheet assembly.

Referring now to FIG. 11, two webs 31, 71 from separate rolls are joined together to form a sheet 49. The first roll of web material 31 is unwound so the facestock 51 is on the top side and the release liner 52 is on the bottom side. As in the previous embodiment, a slitting wheel 32 is positioned a fixed distance from an anvil roll 33. The slitting wheel 32 slits the release liner 52 but not the facestock 51, allowing for the removal of a release liner strip 34, exposing an adhesive 52 that the strip 34 had overlaid. At the same time, the second roll of web material 71 is unwound so the release liner 75 is on the top and the facestock 76 is on the bottom. A similar slitting wheel 43 is positioned a fixed distance from anvil roll 44. The slitting wheel 43 slits the release liner 75 but not the facestock 76 from the second web, allowing for removal of a release liner strip 78 from the web, exposing adhesive that the strip 78 had overlaid. The web materials 31, 71 are brought together at, for example, an idler or nip roller 37, and the two exposed adhesive surfaces are aligned so they can bond in a way that minimizes the amount of exposed adhesive without overlapping the facestock and release liners of either web material. The resulting laminate 49 includes a first web portion having the facestock facing one direction, and a second web portion having a release liner facing the same direction. Subsequent steps may include printing, die cutting, perforating, microperforating, scoring, embossing, slitting, sheeting, and stacking the laminate 49.

Figure 12:
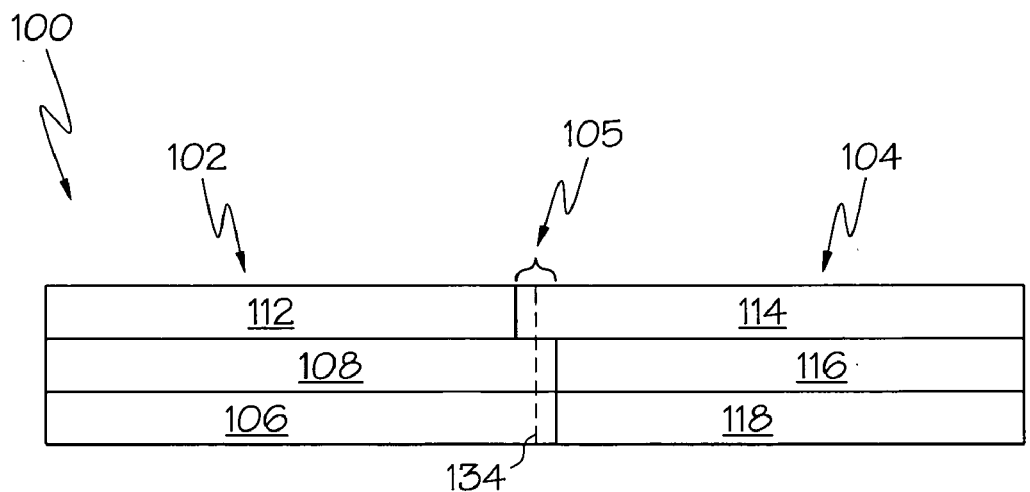
FIG. 12 is a side view of a multilayer sheet assembly including a self-laminating adhesive label.
Figure 13:
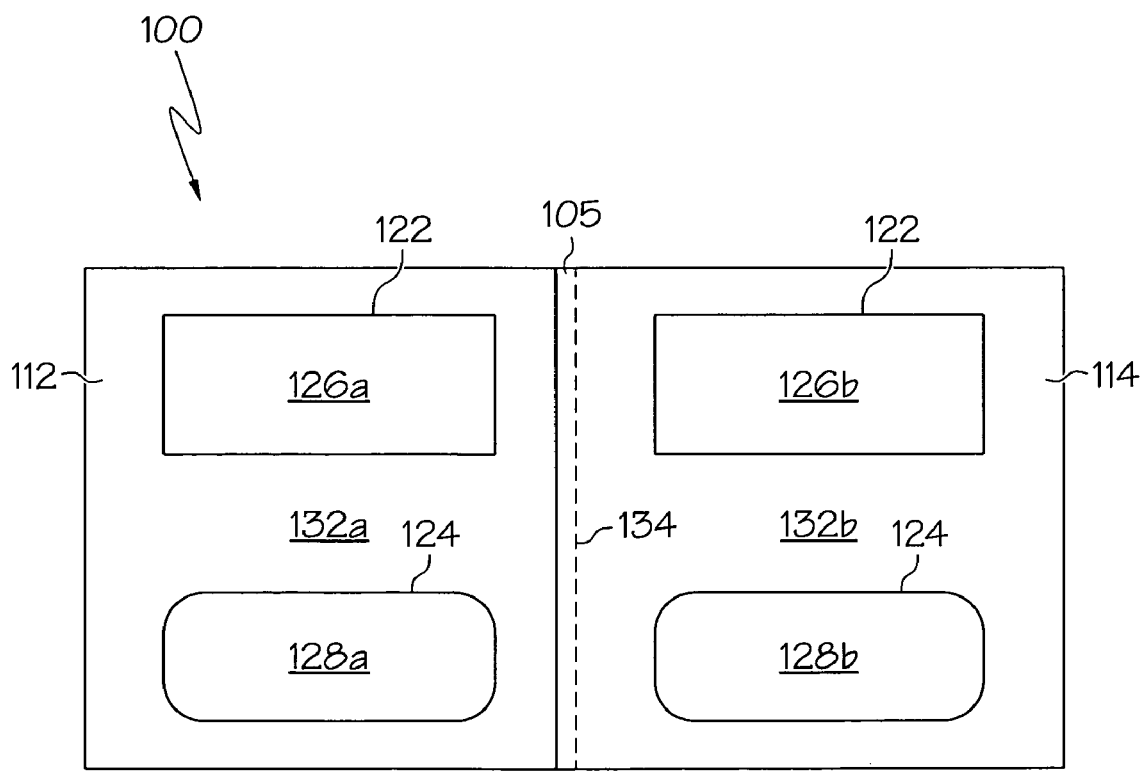
FIG. 13 is a top view of the multilayer sheet assembly depicted in FIG. 12.
Figure 14:
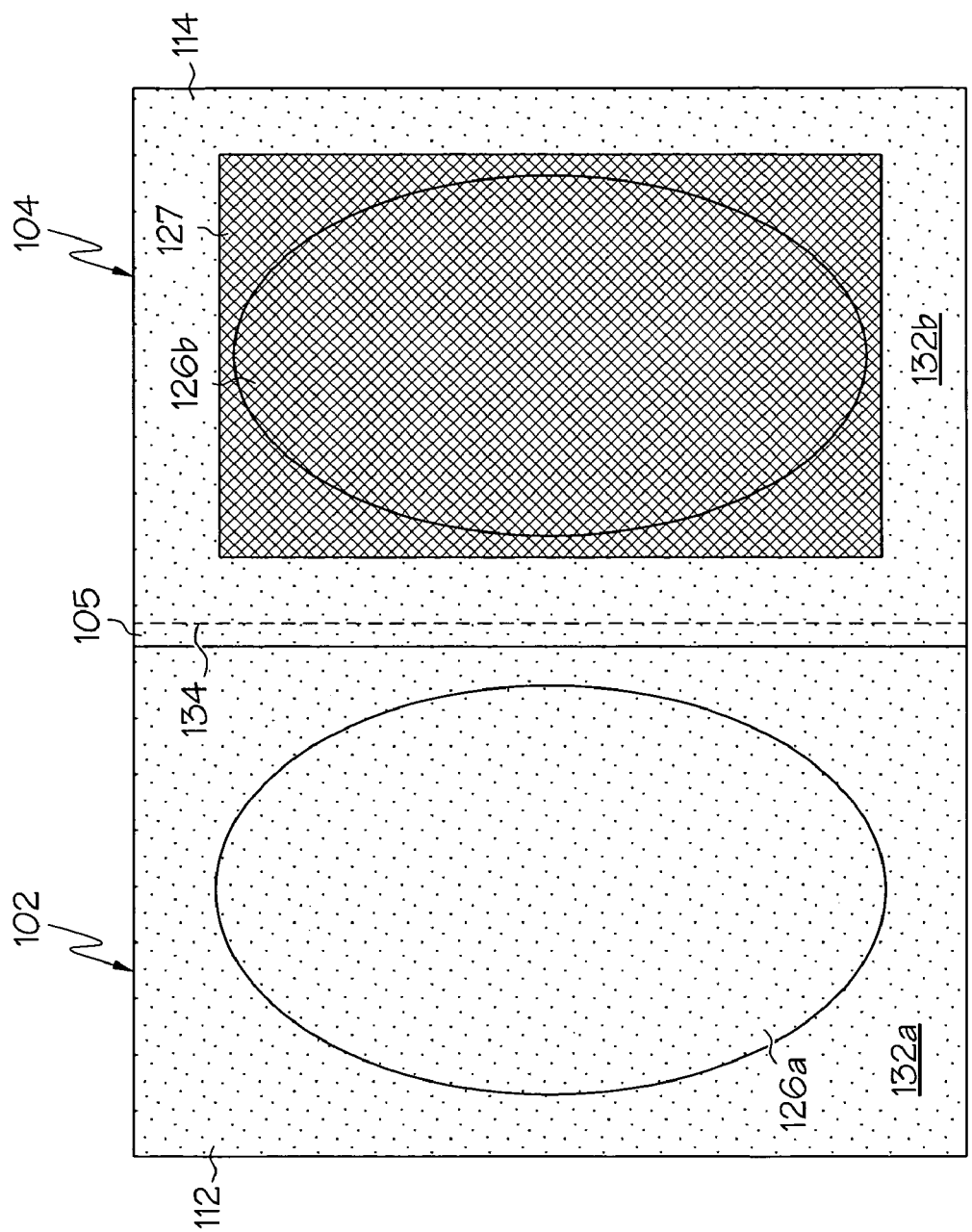
FIG. 14 is a top view of a top view of a multilayer sheet assembly including a self laminating adhesive label, the label having a facestock with graphics printed thereon.

Referring now to FIGS. 12 and 13, a general description of another multiple web sheet will be described. FIGS. 12 and 13 are side and top views of an exemplary desk-top printable and self-laminating adhesive label sheet. The sheet 100 is configured to produce a laminated adhesive label having adhesive on one surface, and an opposite printed surface. In a preferred embodiment, the sheet 100 is an inkjet-printable adhesive label. However, it will be appreciated that the sheet 100 may be configured for other types of printing technology such as laser, color laser, direct thermal, dot matrix, thermal transfer, and dye sublimation technologies, to name a few. Moreover, the sheet 100 may be compatible with any one of numerous commercial printing forms of printing such as flexographic, offset, and gravure printing.

In the depicted embodiment, the sheet 100 is sized to be fed through a paper feeding mechanism in a conventional desk-top printer, and includes a first web 102 and a second web 104 joined into a single construction along an overlap region 105. The first web 102 includes a substantially transparent film facestock 106, an adhesive 108, and a release liner 112, and the second web 104 includes a printable facestock 114, an adhesive 116, and a release liner 118. The first web release liner 112 is aligned with the second web facestock 114, although in other embodiments the two webs 102, 104 are joined such that both webs 102, 104 are oriented with the facestocks 106, 114 and the release liners 112, 118 on the same sides of the sheet 100. Any one of numerous other configurations may be produced according to the present invention, some of which are depicted and described further below.

The adhesive layers 108, 116 within the first and second webs 102, 104 may comprise any one of numerous types of adhesives, but in a preferred embodiment each adhesive layer 108, 116 comprises a pressure-sensitive adhesive. The adhesives 108, 116 may be either permanent adhesives or removable adhesives. It will additionally be appreciated that the first web adhesive 108 may differ from the second web adhesive 116. For example, one of the adhesives 108 may comprise a permanent pressure-sensitive adhesive, and the adhesive 116 of the second web 104 may comprise a removable pressure sensitive adhesive. In a preferred embodiment, the first web adhesive 108 comprises a permanent pressure-sensitive adhesive, and the second web adhesive 116 comprises a removable pressure-sensitive adhesive. Each of the adhesives 108 and 116 may either fully or partially cover the first and second web facestocks 106 and 114, respectively. Further, one of the adhesives 108 may fully cover the facestock 106, while the other adhesive 116 may partially cover the facestock 118, and vice-versa.

The first web release liner 112 and the second web facestock 114 include diecut patterns 122, 124 that are configured as mirror images of each other. As a result, the first web release liner 112 includes diecut regions 126a, 128a, and the second web facestock 114 includes mirror image diecut regions 126b, 128b. Both the first web release liner 112 and the second web facestock 114 also include mirror image non-diecut regions 132a, 132b. The sheet 100 additionally includes a fold line 134 that is preferably positioned such that the fold line 134 divides the sheet 100 in half, so that the first and second mirror image diecut regions 126, 128 will be aligned when the sheet 100 is folded along the fold line 134. It will be appreciated that the fold line 134 can be implemented in any one of numerous configurations, but is preferably implemented in the form of perforations or microperforations. It will also be appreciated that the diecut regions 126a, 128a may not be mirror images of diecut regions 126b, 128b if it is desirable for the diecut regions 126a, 128a to be larger, smaller, or differently shaped than the diecut regions 126b, 128b. As will be described in detail, providing corresponding images in the two webs 102, 104, and a fold-line 134 that aligns the corresponding images, facilitates easy alignment of the pre-diecut region in a printable facestock with a matching diecut region in a clear film laminate.

Figure 15:
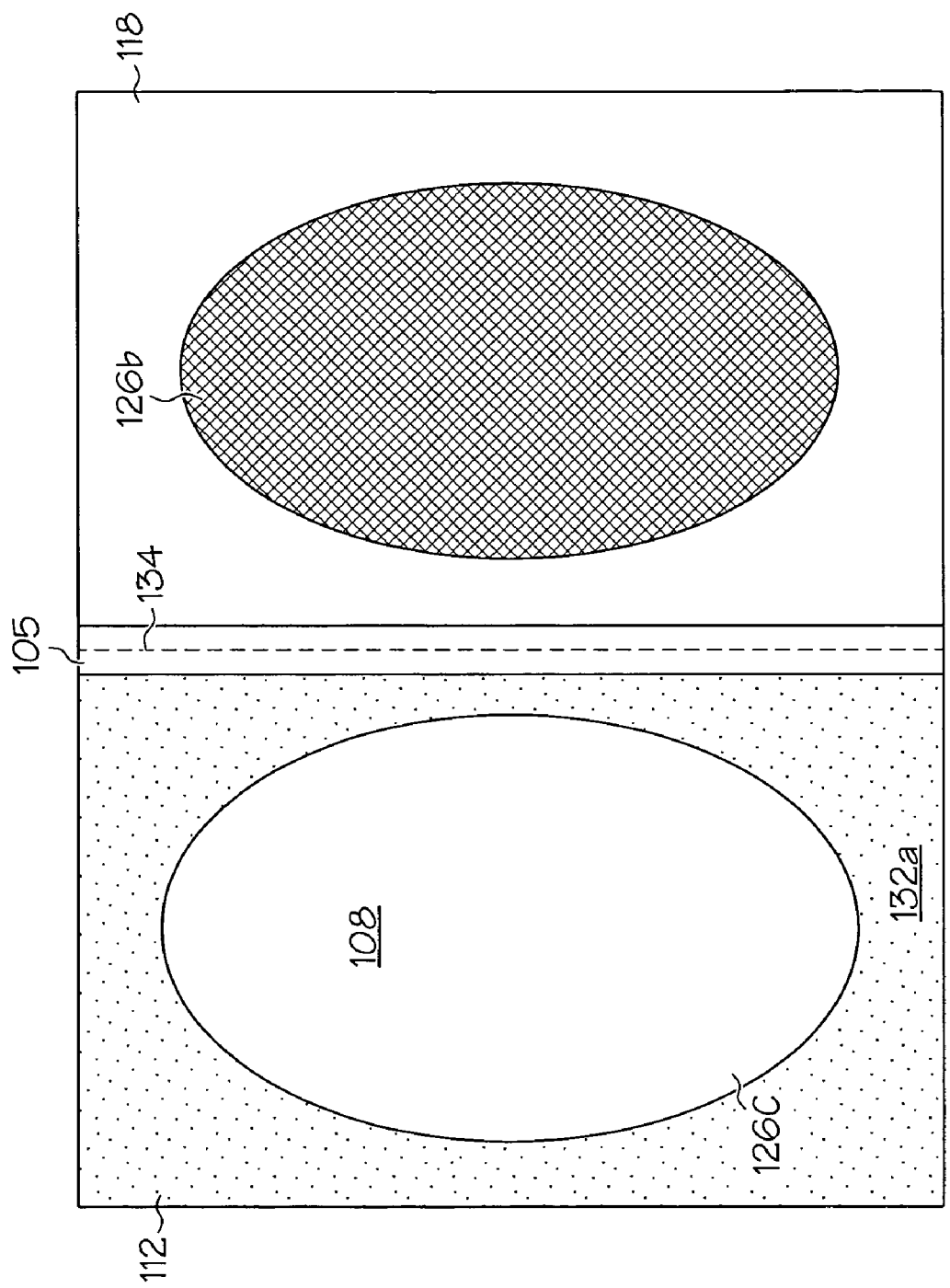
FIG. 15 is a top view of a top view of a multilayer sheet assembly including a self-laminating adhesive label, with unnecessary liner material removed from the facestocks.
Figure 17:
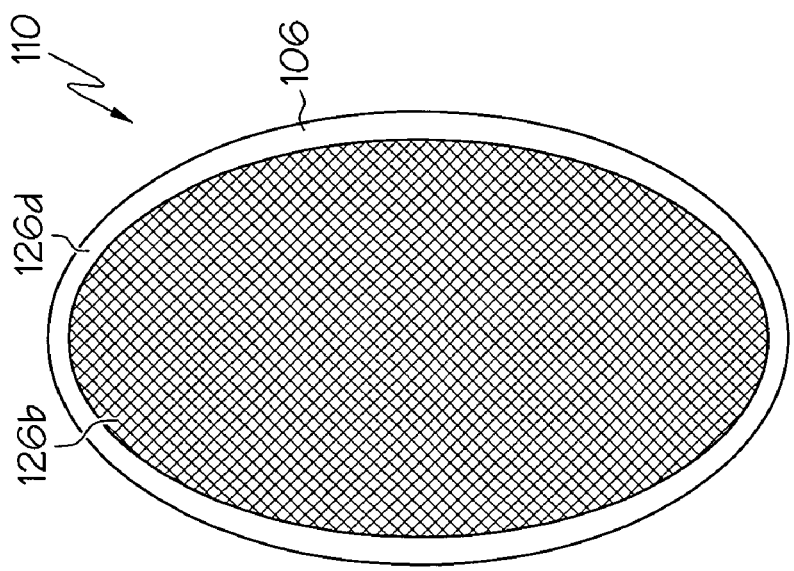
FIG. 17 is a top view of a self-laminated adhesive label formed from a multilayer sheet assembly.
Figure 16:
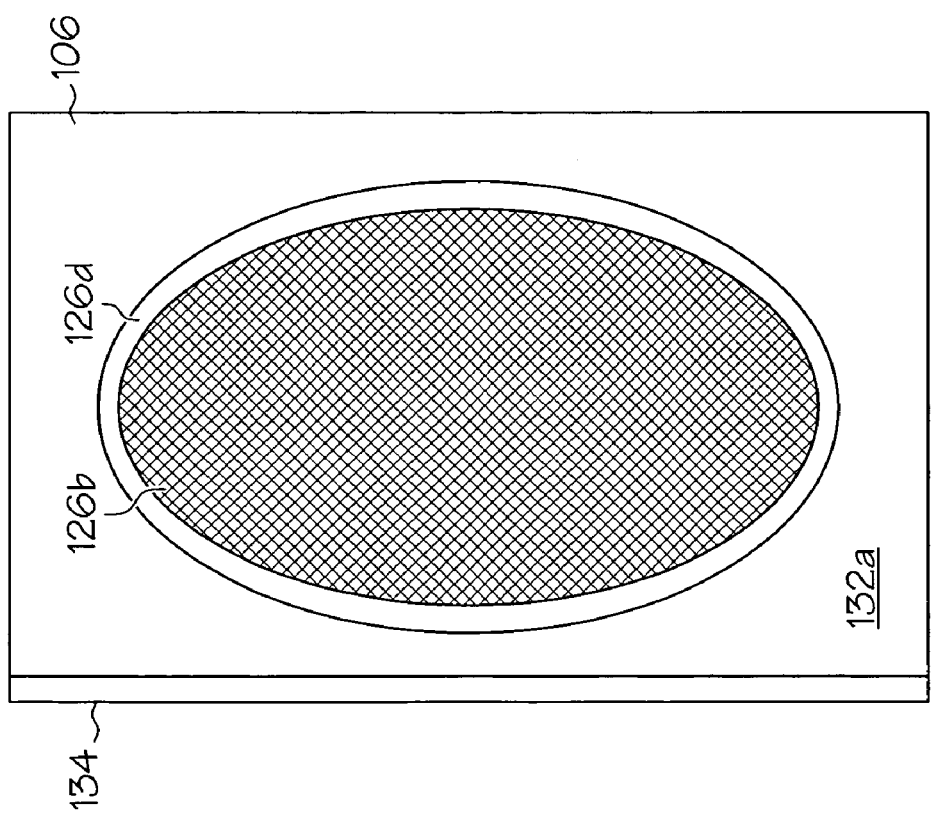
FIG. 16 is a top view of a top view of a multilayer sheet assembly including a self-laminating adhesive label, the sheet being folded so a transparent facestock covers a printed facestock.

Referring to FIGS. 14 to 17, an exemplary method of forming an adhesive label from the sheet 100 is illustrated and will now be described. According to the illustrated embodiment, diecut regions in the second web facestock 114 are smaller than corresponding diecut regions in the first web facestock 112. Beginning with FIG. 14, graphics 127 are printed on the second web facestock 114 using, for example, a non-illustrated desk-top printer. The graphics are printed at least onto the second web facestock diecut region 126b, which defines a desired printing area and shape. In the embodiment depicted in FIG. 14, some of the graphics 127 are also printed onto at least a portion of the second web facestock non-diecut region 132b. After printing, and as depicted in FIG. 15, the second web facestock non-diecut region 132b is removed together with the underlying second web adhesive 116, exposing the second web release liner 118. A portion of the first web release liner diecut region 126a is also removed, exposing a diecut region 126c of the first web adhesive 108. Thereafter, as shown in FIG. 16, the sheet 100 is folded along the fold line 134 so the first web adhesive 108 contacts at least the facestock die cut region 126b. As depicted in FIG. 17, the second web facestock diecut region 126b is removed from the non-diecut region 132a, together with a diecut region 126d of the transparent film facestock 106. As a result, a pressure-sensitive adhesive label 110 is created, the adhesive label 110 having a substantially transparent film laminate over the graphics that have been printed thereon. In the illustrated embodiments, the graphics are entirely laminated. Complete lamination of the graphics overcomes the susceptibility of some inkjet inks to damage by water, abrasion, UV light, and gases in the environment.

The adhesive label 110 may be applied to a surface by removing the second web release liner 118, to thereby expose the second web adhesive 116. The transparent film facestock diecut region 126d is larger than the second web facestock diecut region 126b, and consequently includes a non-overlapping area that forms the outer perimeter of the adhesive label 110. As noted regarding the previously-discussed embodiment, the first web adhesive 108 may include a pressure-sensitive permanent adhesive, and the second web adhesive 116 may include a pressure-sensitive removable adhesive. In other words, the first web adhesive 108 provides substantially stronger adhesion than the second web adhesive 116. Because the first web adhesive 116 is only exposed by the non-overlapping area that forms the outer perimeter of the adhesive label 116, the first web adhesive 108 provides a relatively strong adhesion between the edges of the adhesive label 110 and the application surface to which the adhesive label 110 is adhered, and the second web adhesive 116 keeps the majority of the adhesive label 110 in direct contact with the application surface. If it is subsequently desirable to remove the adhesive label 110 from the application surface, the combination of permanent and removable adhesives creates a simpler removal process for the adhesive label 110 than for an adhesive label that includes only permanent adhesive.

Figure 18C:
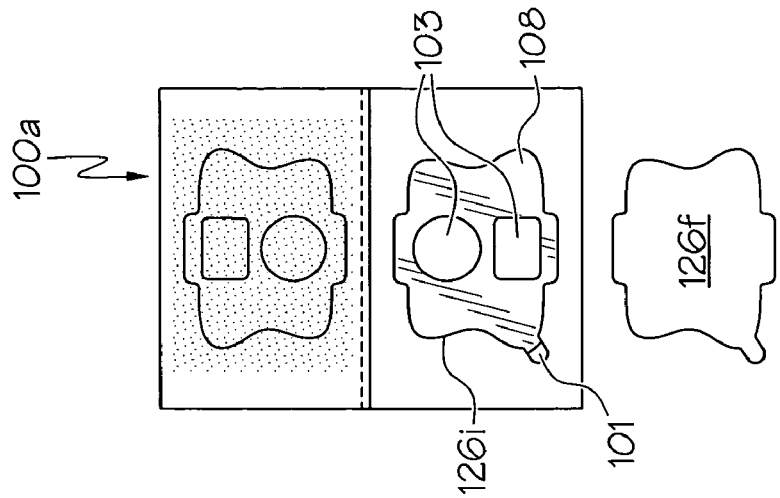
Figure 18B:
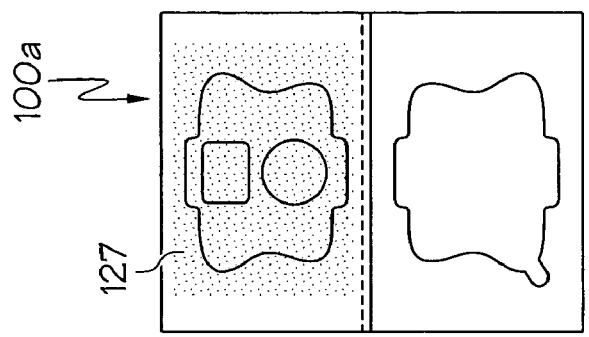

FIGS. 18 to 20 depict additional exemplary adhesive labels and methods of using the adhesive labels. The adhesive labels illustrated in FIGS. 18 to 20 are shaped and sized for use with a portable media player such as the Apple iPod®. Other adhesive labels may be configured to be readily applied to any one of numerous devices including personal electronic devices such as MP3 players, iPods, cell phones, or PDA's, and/or various personal sporting goods such as snowboards and skateboards. As seen in FIGS. 18E and 19E, the adhesive labels 110a, 110b include a transparent film facestock 106 over an underlying web facestock 114 having graphics 127 printed thereon.

Figure 18A:
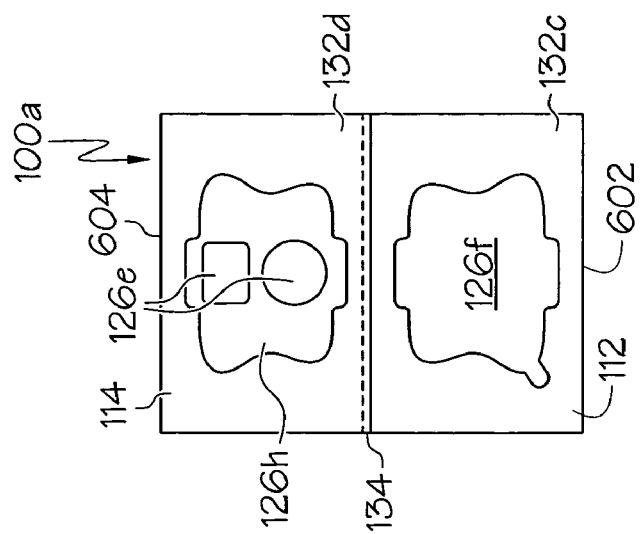
Figure 19C:
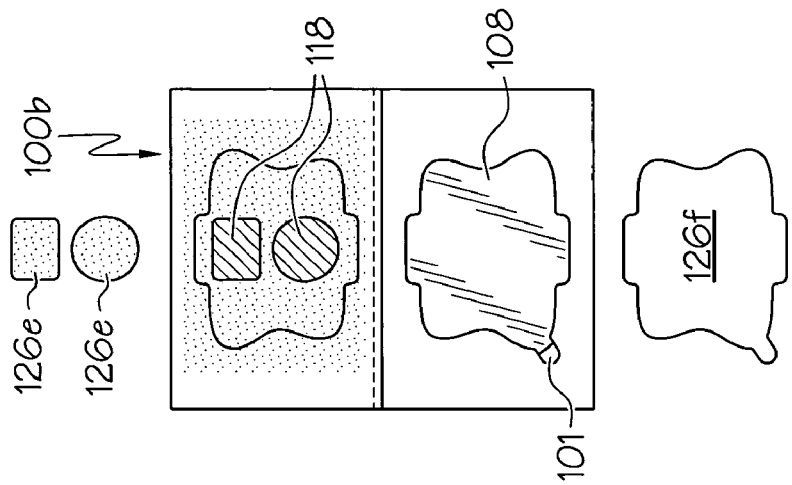

As depicted in FIG. 18A, an adhesive label 110a is formed from a sheet 100a that includes a first web 602 and a second web 604. The first web includes a diecut region 126f and a non-diecut region 132c. The second web includes a diecut region 126h that has approximately the same shape as, but is slightly smaller than, the first web diecut region 126f. The second web also includes a non-diecut region 132d. Inside the second web diecut region 126h are two inner diecut regions 126e that outline the holes 103 that will eventually be formed through the adhesive label 110a.

Graphics 127 are printed onto at least a portion of the second web diecut region 126h. As illustrated in FIG. 18B, the graphics 127 are also printed onto the inner diecut regions 126e and the non-diecut region 132d.

As depicted in FIG. 18C, the diecut region 126f is removed from the release liner 112, exposing a diecut region 126i that is cut through the adhesive 108 and the underlying transparent facestock 106. Removal of the diecut region 126f also reveals a diecut tab 101 that extends through the adhesive layer 108 and the underlying transparent facestock 106. As will be understood from the following description, the diecut tab 101 aids in removing the adhesive label 110a from the sheet 100a. Removal of the diecut region 126f also causes the removal of diecut regions, creating holes 126g corresponding to the inner diecut regions 126e on the facestock 114. Subsequently, the inner diecut regions 126e will also be removed, creating holes 103 through the entire adhesive label 110a to match up with, and expose, a user display and a user interface for the portable media player.

As depicted in FIG. 18D, the sheet 100a is folded along the fold line 134 so the adhesive 108 contacts and adheres to the second web facestock 114. After folding the sheet 100a, the transparent facestock 106 is the topmost layer. The transparent facestock 106 allows the graphics 127 to be viewed. The transparent facestock 106 may be a writable or printable surface, enabling a user to add graphics or text to the transparent facestock 106 to supplement the underlying graphics 127. The additional graphics or text may be written or printed onto the transparent facestock 106 before or after removing the adhesive label 110a from the sheet 100a.

As depicted in FIG. 18E, when removing the adhesive label 110a from the sheet 100 a the diecut regions 126g are left on the sheet 100a. Alternatively, the diecut regions 126g may be removed with the adhesive label 110a and discarded before the adhesive label 110a is adhered to a portable media player.

FIGS. 19A to 19E depict a method of producing an adhesive label 110b that is similar to the adhesive label 110a depicted in FIG. 18E, starting from a sheet 100b that is similar to the adhesive label 100a depicted in FIG. 18A, and includes a first web 608 and a second web 610. The difference between sheets 100a and 100b is that sheet 100b does not have diecut regions that form holes through the entire adhesive label 110b inside diecut region 126f. When the adhesive label 110b is applied to a portable media player, the transparent facestock 106 covers the user display and the user interface. However, the transparent facestock 106 is sufficiently thin to allow a user to view and manipulate the user display and the user interface.

Figure 19B:
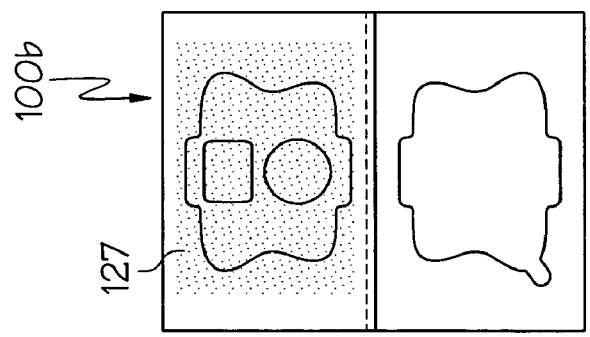
Figure 19A:
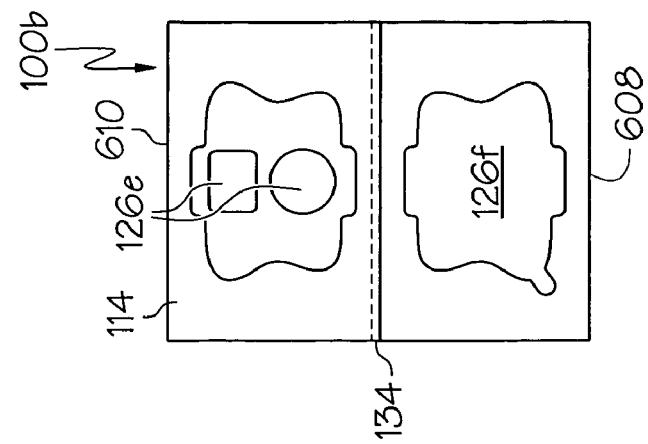

Graphics 127 are printed onto at least a portion of the second web diecut region 126h, as depicted in FIG. 19B. For this and other embodiments, the graphics 127 may be printed onto the diecut regions and the non-diecut regions of the second web facestock 114. Further, in a preferred embodiment the graphics 127 cooperate with the contours formed by the adhesive label edges. For example, the graphics in the illustrated embodiment the adhesive label has outer edges that shape the label as a guitar. In such an embodiment, the graphics may draw attention to, or cooperate with the guitar shape to provide details to the guitar shape so that a user will readily identify the adhesive label with a guitar. Various other graphics may be used in cooperation with various other label shapes as well.

As depicted in FIG. 19C, the diecut region 126f is removed from the release liner 112, exposing the adhesive 108. Removal of the diecut region 126f also reveals the diecut tab 101 that extends through the adhesive 108 and the underlying transparent facestock 106. Diecut regions 126e are also removed from the second web facestock 114, revealing the release liner 118.

As depicted in FIG. 19D, the sheet 100b is folded along the fold line 134 so the exposed adhesive 108 contacts and adheres to the second web facestock 114. After folding the sheet 100b, the transparent facestock 106 is the topmost layer. The transparent facestock 106 may be a writable or printable surface that allows the graphics 127 to be viewed. Graphics or text may be written or printed onto the transparent facestock 106 before or after removing the adhesive label 110b from the sheet 100b.

Figure 20A:
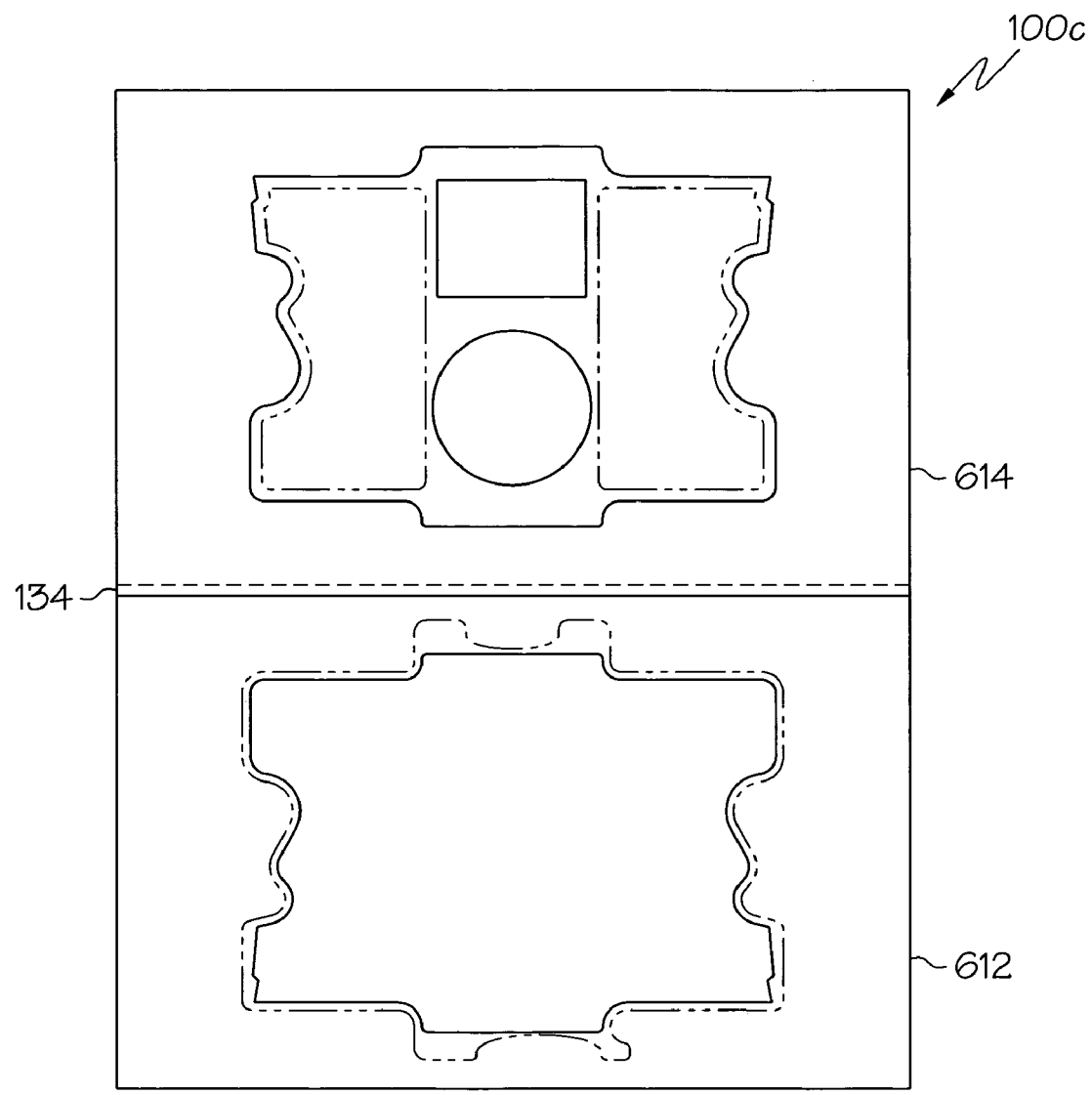
FIGS. 20A is a top views of a multilayer sheet assembly including a self-laminating adhesive label having opposite sides that are adapted to wrap around an apparatus and come into proximity with each other to form a predetermined images.
Figure 20B:
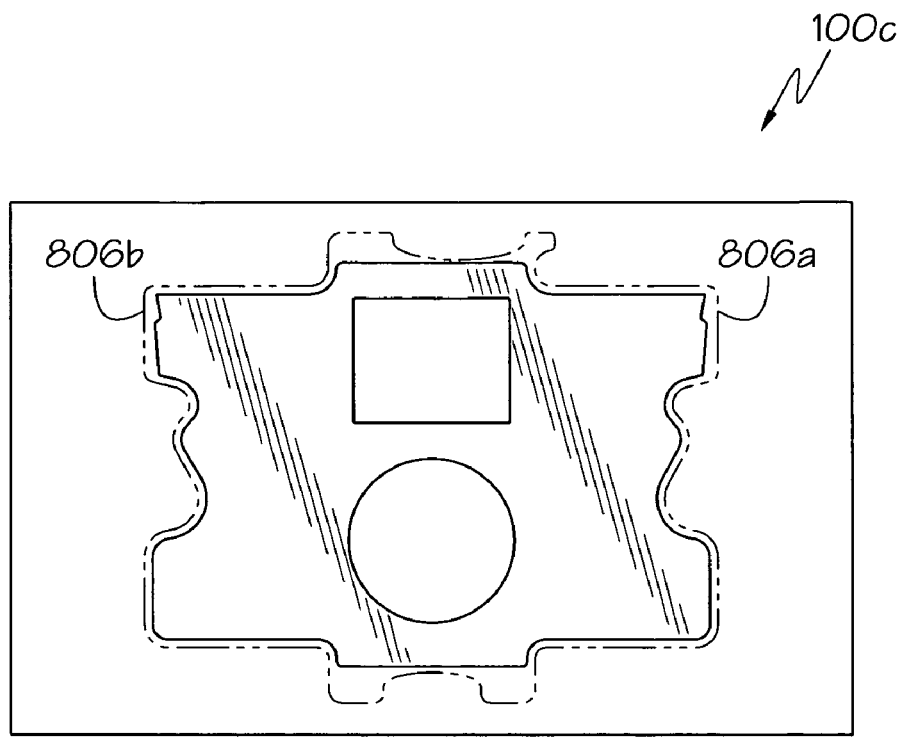
FIG. 20B is a top view of the multilayer sheet assembly of FIG. 20A, with the sheet folded along a perforated fold line.
Figures 20C, 20D:
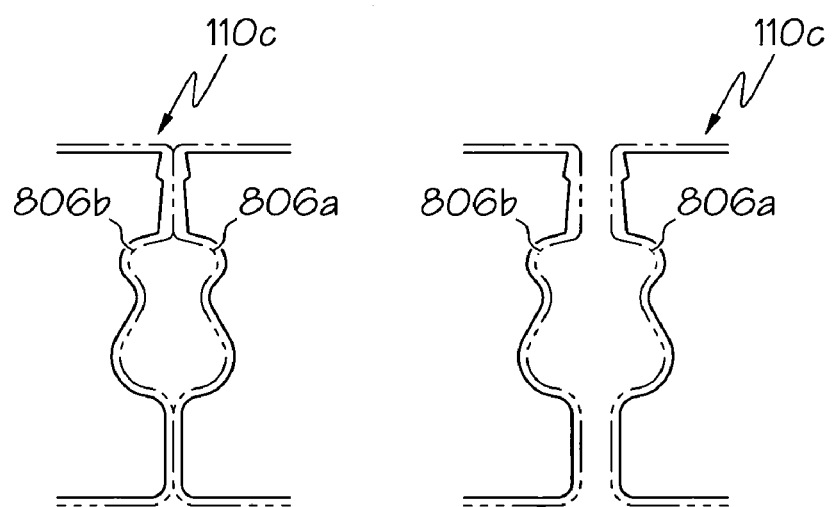

Turning now to FIGS. 20A to 20F, another exemplary adhesive label 110c is depicted, and FIGS. 20C and 20F illustrate edges of the adhesive label 110c wrapped around a portable media player. The adhesive label 110c is formed from a sheet 100c that includes a first web 612 and a second web 614, as depicted in FIG. 20A. FIG. 20B depicts the sheet 100c in a folded state as previously discussed with reference to FIGS. 18D and 19D. The sheet 100c may represent either of the sheets outlined in FIGS. 18A to 18E and FIGS. 19A to 19E. In addition, the sheet 100c may simply be a single web that includes a facestock, an adhesive, and a liner. Further, the sheet 100c may only include a single facestock and an adhesive. Other sheet configurations described herein may also be utilized. Further, graphics may be printed on the sheet 100c.

A feature of the completed adhesive label 110c depicted in FIGS. 20C to 20F is that the adhesive label 110c includes first and second edges 806a, 806b that are brought into proximity with one another when the adhesive label 110c is wrapped around a portable media player. The first and second edges 806a, 806b are contoured in a manner that causes the edges 806a, 806b to together outline a predetermined "negative image" on a surface of the portable media player. More particularly, the first edge 806a includes a contoured portion that outlines a first predetermined image component, and the second edge 806b includes another contoured portion that outlines a second predetermined image component.

The first and second image components may or may not completely outline the predetermined image. For example, FIG. 20C depicts the first and second edges 806a, 806b abutting one another and completing an outline of a guitar. FIG. 20D depicts the first and second edges 806a, 806b adjacent to, but not abutting one another so the guitar outline is discontinuous. Although in the illustrated embodiment the first and second edges 806a, 806b together outline the shape of a guitar, numerous other negative images may be completely or partially outlined using contoured first and second edges 806a, 806b.

According to other exemplary embodiments illustrated in FIGS. 20E and 20F, printing 127 is also included on the adhesive label 110c. The printing 127 accentuates, cooperates with, or forms a part of the negative image. For example, the adjacent edges 806a, 806b and some area inward from the edges may be simply colored to draw attention to the negative image that the adjacent edges form. FIG. 20E depicts the first and second edges 806a, 806b outlining the shape of a guitar, with additional printing 127 surrounding the edges 806a, 806b to accentuate the guitar shape. FIG. 20F depicts the first and second edges 806a, 806b together forming the hole in a guitar. The negative image of the guitar hole is supplemented with printing 127 that is combined when the adhesive label 110c is wrapped around the apparatus to outline a guitar, including a handle and frets, around the guitar hole formed by the first and second edges 806a, 806b.

As previously discussed, the first web 102 and/or the second web 104 arrangements may vary from the embodiment depicted in FIG. 12. In some embodiments, the first and second webs 102, 104 include additional layers. As depicted in FIG. 21, an alternate sheet 200 includes first and second joined webs 802, 804 made from the same transparent facestock and printable facestock. The transparent facestock and printable facestock are coated with a release agent and an adhesive, the facestocks are laminated, and the laminate is then perforated to form two webs 802, 804. In the first web 802 the release agent 812a is disposed between the adhesive 814a and the transparent facestock 816a, and the adhesive 814a is disposed between the printable facestock 808a and the release agent 812a. In the second web 804 the release agent 812b is disposed between the printable facestock 808b and the adhesive 814b, and the adhesive 814b is disposed between the transparent facestock 806b and the release agent 812b. In another alternative embodiment depicted in FIG. 22, a sheet 300 has a construction similar to that of FIG. 21, but the first web 802 includes a removable adhesive 902 and the second web 804 includes a permanent adhesive 904.

Figure 23:
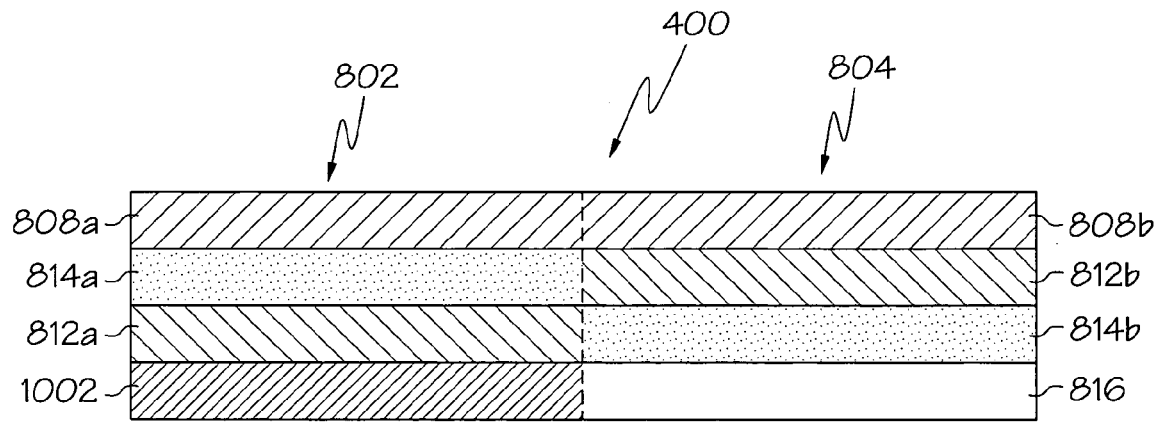
Figure 24:
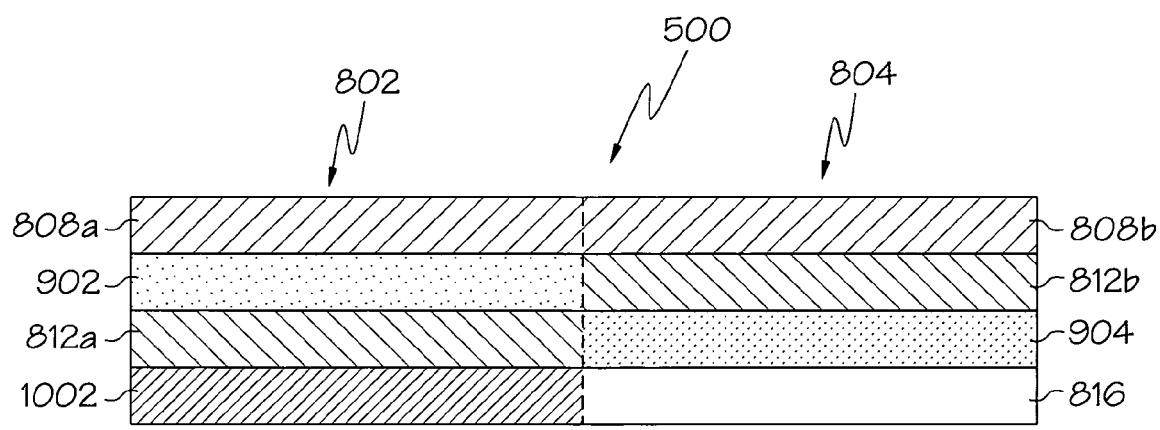

In other embodiments, respectively depicted in FIGS. 23 and 24, only one web includes a transparent facestock. The embodiment depicted in FIG. 23 is like the embodiment depicted in FIG. 21, except the first web 802 includes a release liner 1002 rather than the transparent facestock 816a. An exemplary release liner material is a pre-siliconized release liner. Likewise, the embodiment depicted in FIG. 24 is like the embodiment depicted in FIG. 22, the first web 802 having a removable adhesive layer 902 and the second web 804 having a permanent adhesive 904, except the first web 802 includes a release liner 1002 rather than the transparent facestock 816a.

Utilizing the above methods of sheet production, it is possible to combine virtually any pressure sensitive laminate with one or more single multi layer constructions. This may be done with two or more webs, with slitting and stripping one or more webs for adhesion of the webs. This technology is not limited to desktop printable sheets, or to sheets at all, as it could be utilized to produce fan folded or roll products with unique characteristics as well.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:
1. A multilayer sheet assembly, comprising:
an adhesive label having a shape that is configured to be wrapped around an apparatus and to outline a predetermined image having first and second components, the adhesive label comprising:
a first release liner,
a first facestock comprising:
an outer surface,
an inner surface including a lined portion that is covered by the first release liner, and an unlined portion that is not covered by the first release liner, and
opposite first and second edges that come into proximity with one another when the adhesive label is wrapped around the apparatus, the first edge including first contours that outline the first component of the predetermined image, and the second edge including second contours that outline the second component of the predetermined image, and
a first adhesive coated over at least portions of both the lined and unlined portions of the first facestock inner surface, and
a second facestock including an overlapping portion, the overlapping portion covering at least some of the unlined portion of the first facestock inner surface, and adhered thereto using at least the first adhesive;

wherein:
the second facestock overlapping portion covers the entire unlined portion of the first facestock inner surface, and
the second facestock overlapping portion abuts but does not overlap with the first release liner.

* * * * *